United States Patent [19]
Binder

[11] 3,826,047
[45] July 30, 1974

[54] DEVICE FOR MOUNTING AND ORIENTING A WORKPIECE

[75] Inventor: Wolfgang Max Binder, Indianapolis, Ind.

[73] Assignee: RCA Corporation, New York, N.Y.

[22] Filed: Feb. 28, 1972

[21] Appl. No.: 230,009

[52] U.S. Cl............... 51/277, 51/281 R, 82/45, 269/321 T
[51] Int. Cl....... B24b 1/00, B23b 25/06, B23q 3/14
[58] Field of Search.......... 51/227, 277, 237 R, 281; 279/2, 1 G, 108, 1 J, 1 L; 90/1; 269/48.1, 49, 50, 52, 321 T, 287; 29/406, 559; 82/287, 45, 44

[56] References Cited
UNITED STATES PATENTS

| | | | |
|---|---|---|---|
| 835,320 | 11/1906 | Pomeroy | 51/237 R |
| 1,223,219 | 4/1917 | Tichborne | 51/227 R |
| 3,381,347 | 5/1968 | Reinwall | 51/227 R X |
| 3,456,398 | 7/1969 | Gingrich | 51/227 R |
| 3,476,376 | 11/1969 | Jacoby | 51/227 R X |
| 3,610,643 | 10/1971 | Thompson | 279/2 X |

*Primary Examiner*—Al Lawrence Smith
*Assistant Examiner*—Nicholas P. Godici
*Attorney, Agent, or Firm*—Edward J. Norton; William Squire

[57] ABSTRACT

A grinding machine provides for the automatic aligning of the mean axis of an irregular surface of revolution on a workpiece to a machine axis and for indexing the aligned workpiece to a plurality of workstations including first and second indexing tables for grinding planar surfaces and surfaces of revolution on the workpiece with respect to the mean axis.

35 Claims, 17 Drawing Figures

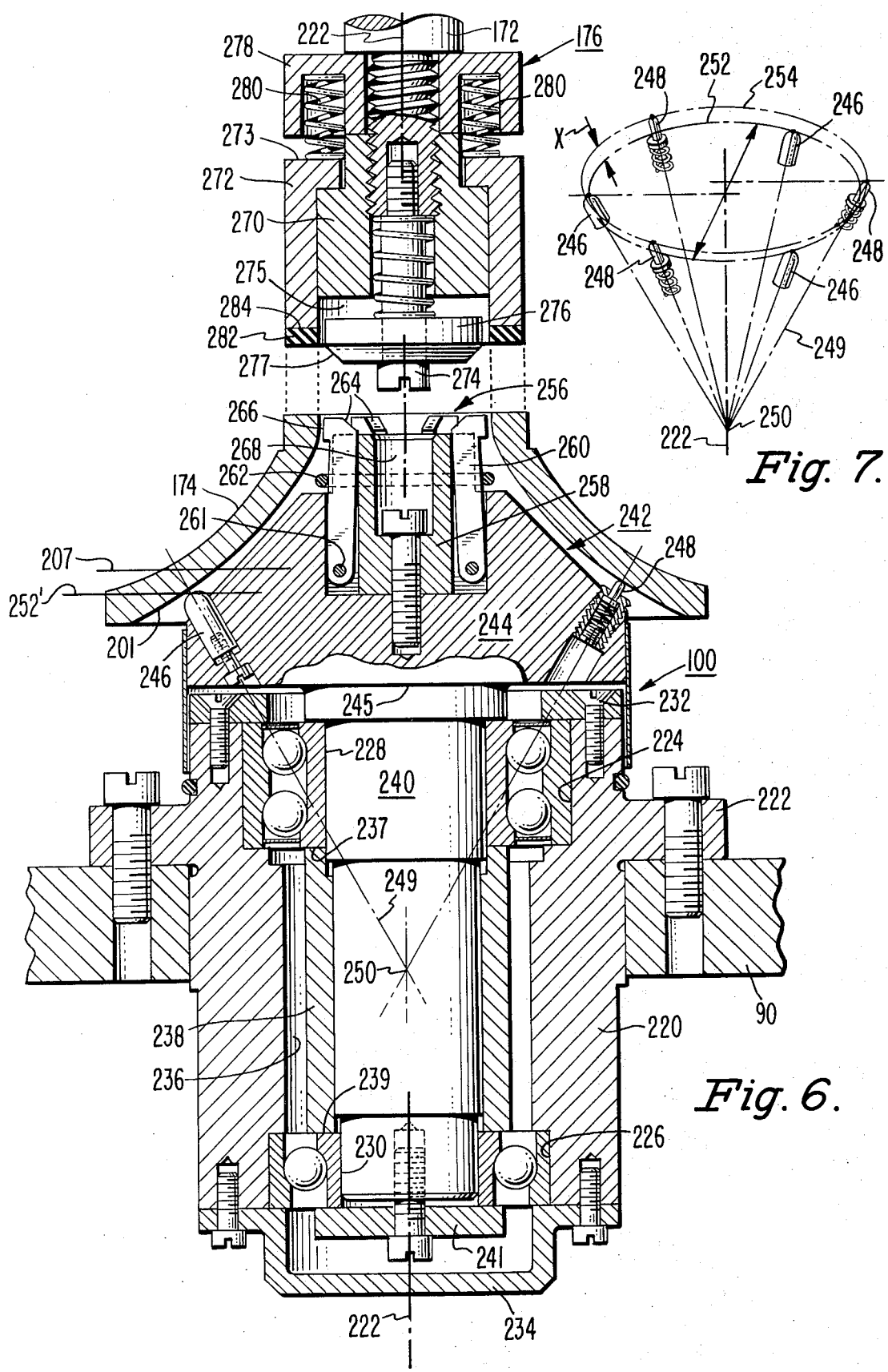

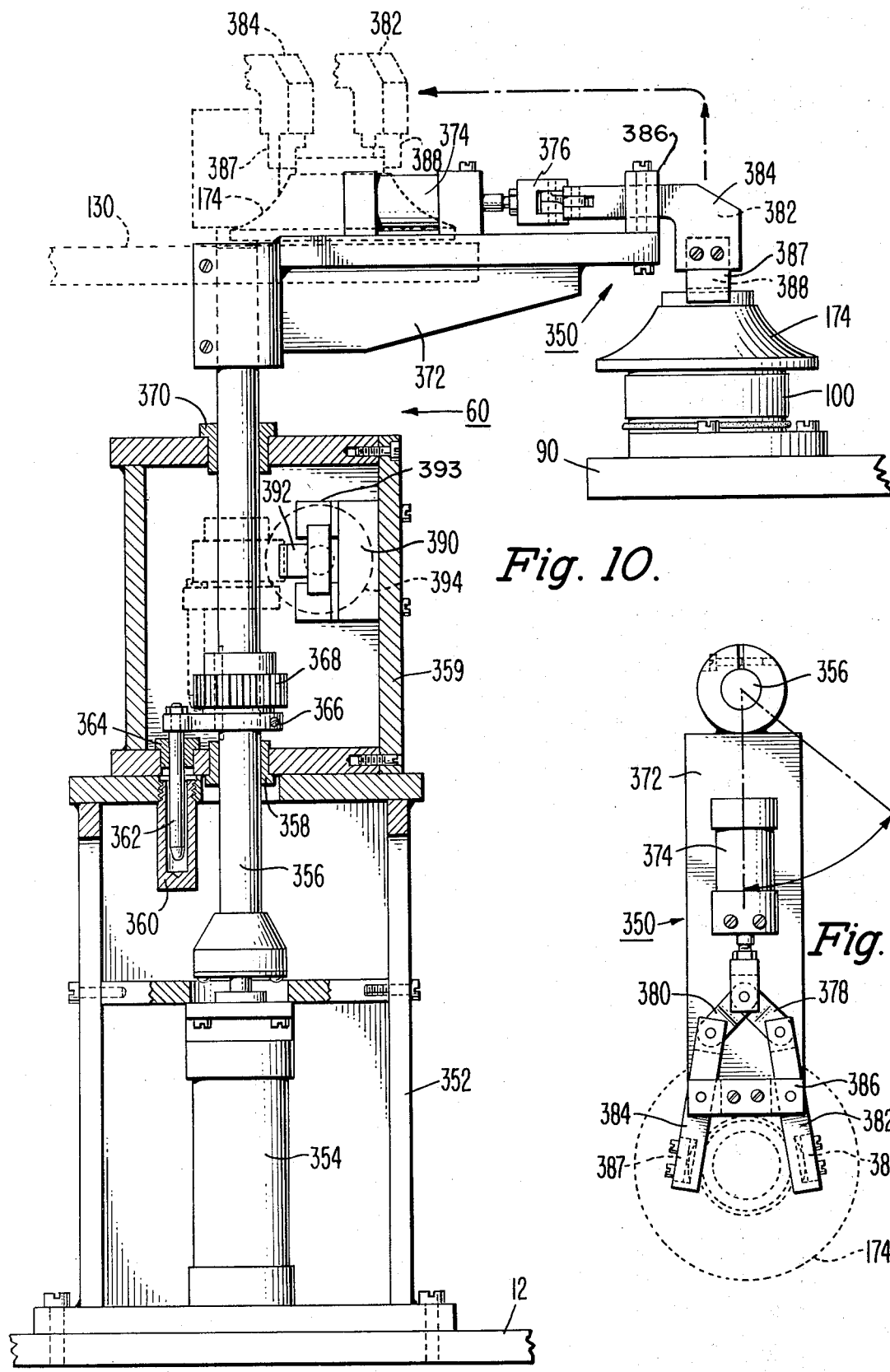

DEVICE FOR MOUNTING AND ORIENTING A WORKPIECE

This invention relates to a grinding machine and more particularly to an apparatus for abrading planar and surfaces of revolution on a workpiece, the expression "abrading" including those machine processes which remove material by the use of friction.

In the grinding art it is usually the purpose of grinding to finish a workpiece to precise dimensional requirements. To that extent a workpiece to be ground is accurately located on one surface while a second surface is finished either with respect to the locating surface or to an imaginary axis such as provided in centerless grinding.

With all such machines, usually, it is the object of the grinding machine to perform the grinding of a single dimensional characteristic such as an internal or external diameter or a single planar surface. In some cases a plurality of surfaces parallel or concentric with one another may also be ground on a single grinding machine to generate similar types of surfaces. However, a problem arises when a reference surface on the workpiece is insufficient for locating as well as securing the workpiece to the machine for performing the grinding operation. In this latter case, it is the usual practice to generate a second surface by which the piece part can be both located and clamped for generating the desired finished surface. In this later case the labor required is expensive requiring the services of a skilled operator who is capable of setting up the pieceparts on the machine and adjusting the machine tool so as to remove the desired amount of material while at the same time locating the generated surface with respect to a reference surface. Both the locating of a workpiece, especially one that is warped or distorted, and the removal of a given amount of material to precise dimensional requirements is usually the work of a skilled technician expecially where the workpiece needs to be transferred from one fixture to another in order to completely finish the workpiece.

SUMMARY OF THE INVENTION

In accordance with the present invention, an apparatus is provided for orienting the mean axis of an irregular inner surface of a hollow workpiece to an apparatus axis. The apparatus includes means for orienting the workpiece so that the mean axis intersects the apparatus axis, and means for tilting the workpiece so that the mean axis is substantially coincident with the apparatus axis and simultaneously axially displacing the workpiece to a plane normal to the apparatus axis and defined by rigid support members secured to the apparatus and positioned to abut the inner surface. As a result the mean axis of the irregular inner surface is located axially and transversely with respect to the machine axis permitting the machine to generate planar and surfaces of revolution with respect to that mean axis.

A feature of the machine constructed in accordance with the present invention is an indexable workhead mounted on a machine base, the above-described apparatus being mounted on the workhead whereby the workhead indexes the oriented workpiece to a workstation. An additional feature includes means for rotatably mounting the above-described apparatus on the workhead, the workhead including means for rotatably driving the oriented workpiece.

A further feature includes a second indexable workhead mounted on the machine base, the second workhead including workpiece support and clamping means secured thereto. Transfer means are mounted on the base for transferring the oriented workpiece from the first workhead to the second workhead. Additionally, a method of orienting the mean axis of an irregular inner surface of a hollow workpiece to a given axis is provided which includes orienting the workpiece so that the mean axis intersects the given axis, and tilting the workpiece so that the mean axis is substantially coincident with the given axis and simultaneously axially displacing the workpiece to a plane normal to the given axis and defined by a plurality of rigid support members positioned to abut the inner surface.

IN THE DRAWINGS

FIG. 1 is a partial plan view of the grinding machine according to the principles of the present invention, FIG. 2 is a partial front elevational view of the machine along lines 2—2 of FIG. 1, FIG. 3 is a partial fragmented side view of a portion of the machine along lines 3—3 of FIG. 1, FIG. 4 is a front elevational view of a portion of the machine as observed in FIG. 3, FIG. 5 is a plan view of the apparatus as shown in FIG. 4, FIG. 6 is a cross sectional view of the clamp, align, locate and drive mechanism along lines 6—6 of FIG. 3, FIG. 7 illustrates the relationship of the resilient and rigid support members of FIG. 6, FIGS. 8a and 8b are side and plan sectional views of a workpiece illustrating typical distortion therein, FIG. 8b being taken along line 8b—8b of FIG. 8a, FIG. 9 is a partially fragmented plan view along lines 9—9 of FIG. 2, FIG. 10 is a partial front cross sectional view of a transfer mechanism taken generally along the lines 10—10 of FIG. 1 with the transfer arm swung around counterclockwise in the lowered position about to grasp a workpiece and lift it off its support apparatus, FIG. 11 is a plan view of the apparatus of FIG. 10, FIG. 12 is a front schematic elevational view of a control panel, and FIGS. 13 through 16 are schematic views showing the electrical circuitry of the apparatus.

DESCRIPTION OF THE PREFERRED EMBODIMENT

Figure 1:
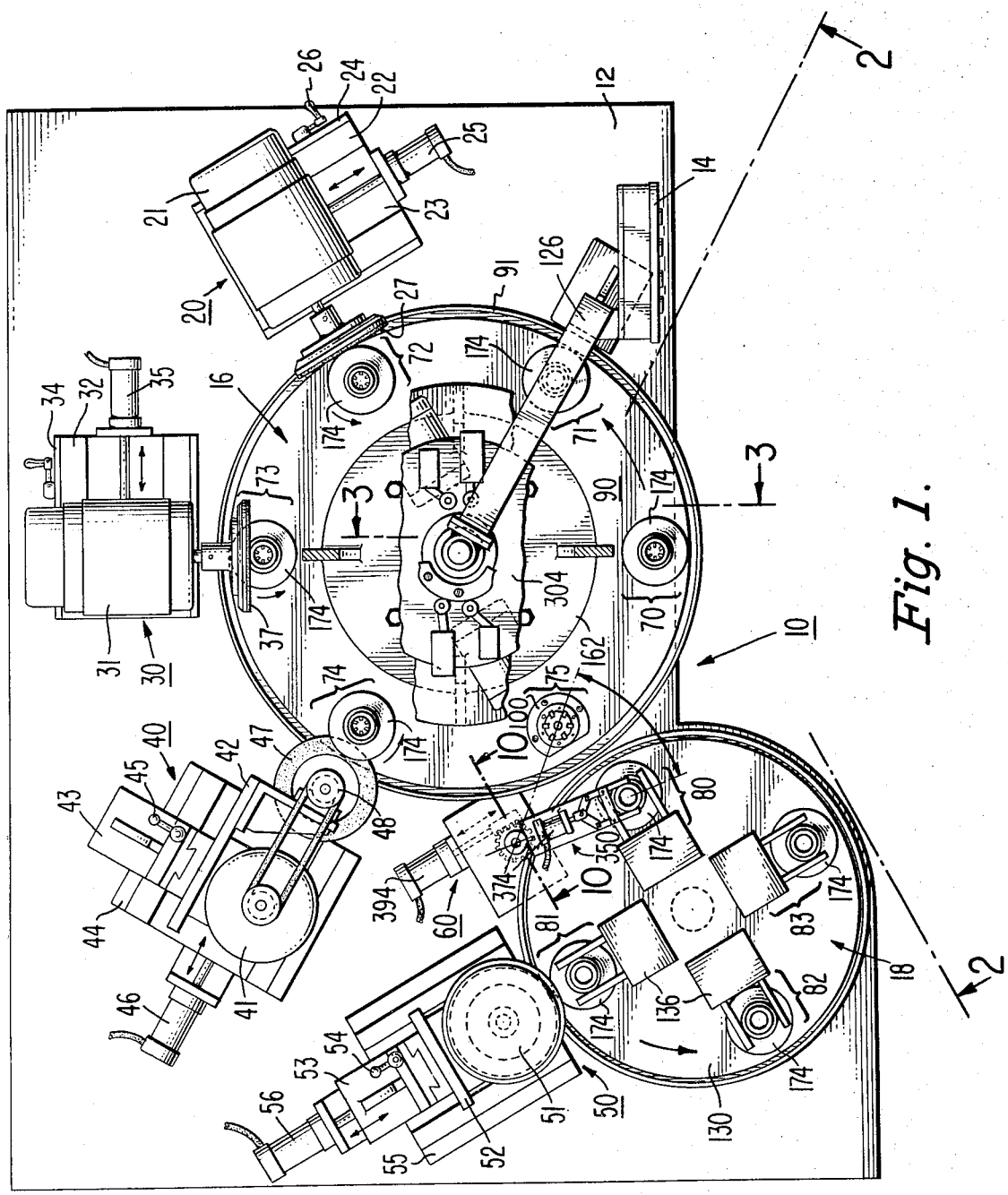
Figure 2:
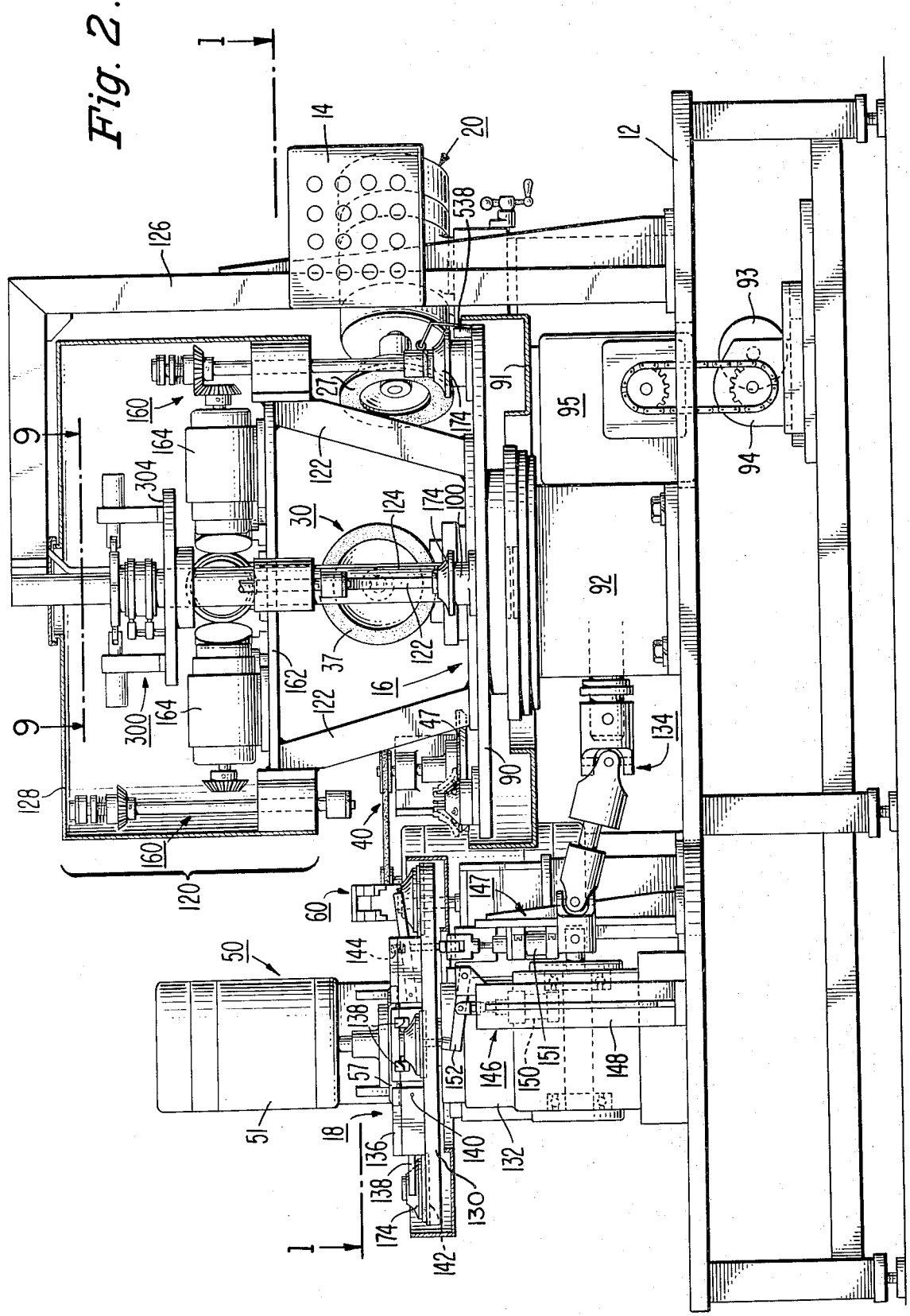

In describing the grinding machine of the present invention, the front of the machine will generally refer to the position at which an operator will be located for loading and unloading the machine, and for manipulating the operator controls. In FIGS. 1 and 2, grinding machine 10 includes a base 12 which encloses the various compressed air systems (not shown) and hydraulic systems (not shown), and which comprise conventional motor pump, sump and the necessary connections. A conventional coolant system is also provided (not shown) which is suitable for such grinding applications as provided in accordance with the present invention.

Mounted on base 12 is control panel 14 in front of which the operator stands. The operation of the control panel 14 will best be understood in conjunction with FIGS. 12 through 16 and in conjunction with the explanation of the operation of the machine. Rotatably mounted on base 12 is a first workhead 16 and second workhead 18. Slidably mounted on base 12 are wheelheads 20, 30, 40 and 50. Also mounted on base 12 is workpiece transfer mechanism 60 which serves to transfer the workpiece from workhead 16 to workhead 18. Workhead 16 includes six workstations 70 through 75 disposed around the periphery of workhead 16 as shown in FIG. 1. Workhead 18 has four workstations 80 through 83 as also shown in FIG. 1.

Workhead 16 will now be described. Workhead 16 comprises an indexing table 90 which is generally a circular flat metal plate mounted to an indexing head 92 which is secured to base 12. Indexing head 92 is a suitable Geneva mechanism or other indexing device for indexing table 90 so that workstations 70 through 75 are disposed as shown. Mounted on base 12 are gear boxes 94 and 95 which are suitably driven by d.c. motor 93. Not shown is a conventional cam and switch assembly coupled to indexing head 92, which is driven in synchronism with workheads 16 and 18 and which will be further described with respect to FIGS. 13–16.

Mounted at each of workstations 70 through 75 on table 90 are workpiece aligning and support nests 100. Nests 100 will be later described in detail in conjunction with FIG. 6. At each of workstations 70 through 75 there is disposed one nest 100. Each nest serves to align and support a single workpiece to be operated on by wheelheads 20, 30 and 40.

Secured to indexing table 90 and rotatable there with is superstructure assembly 120. Superstructure assembly 120 includes workpiece align, support and drive assembly 160 and power interconnecting assembly 300 which will be best described in conjunction with FIGS. 3, 4, 5 and 9. Superstructure assembly 120 is supported on table 90 by a plurality of strut supports 122 and a center post support 124. The upper portion of superstructure 120 is transversely retained by arm and post 126. Arm and post 126 is mounted on base 12 and overhangs the central portion of superstructure 120 depending downwardly at the center of the machine. Post 126 serves not only as a retaining post for the superstructure, but also serves a a power conduit for both compressed air and electrical power supplied to various elements on the superstructure. Surrounding the superstructure is a sheet metal housing 128 which is suitably connected by means (not shown) to base 12. Disposed just below the indexing table 90 is a suitable coolant collecting pan 91.

Workhead 18 is disposed adjacent to workhead 16 on base 12. Workhead 18 includes a flat circular metal indexing table 130 which is rotatably mounted to indexing head 132 which in turn is mounted on base 12. Indexing head 132 includes a conventional Geneva mechanism or the like. This mchanism is rotatably coupled to the Geneva mechanism of indexing head 92 by linkage 134 so that table 130 indexes in synchronism with table 90. Mounted on table 130 at each of workstations 80 through 83 are workpiece clamp assemblies 136. Disposed in worktable 130 at each of the workstations is a suitable raised carbide workpiece locating insert 142. Disposed directly below clamp assemblies 136 at stations 83 and 80 are respective identical clamp release assemblies 146 and 147 mounted on base 12. Clamp release assembly 146 is disposed directly beneath workpiece clamp assembly 136 at station 83 and assembly 147 is disposed underneath workpiece clamp assembly 136 at station 80.

Not shown is a suitable master control panel housing the various relays and circuitry of grinding machine 10.

It is to be understood that certain of the machine elents have been omitted in each of the drawings for purposes of simplicity of explanation.

Clamp Assembly 136 and Clamp Release Assembly 146

Each of clamp assemblies 136 has a pair of elongated finger-like jaws 138 which pivot about pin 140 for securing a workpiece against insert 142. Jaws 138 are normally maintained in a downward or clamped position by a spring 144 mounted to abut in clamp assembly 136 and to exert a compressive force against the jaws 138. To release the piece part the jaws are forced against the spring 144 in the opposite direction by clamp release assemblies 146 and 147. Since assemblies 146 and 147 are identical, only one will be described. Assembly 146 includes a support 148 mounted on base 12 and an air cylinder 150 mounted on the support and a jaw release lever 152 pivotally mounted to the shaft of air cylinder 150 and support 148 for driving jaws 138 away from table 130, releasing the clamped piece part. Thus the jaws of clamp assembly 136 are in only the clamp position in stations 81 and 82 and may be in either the clamped or unclamped position only in stations 80 and 83 in accordance with the release condition of assemblies 146 and 147.

Wheelheads

Wheelheads 20 and 30 are substantially similar in construction and only one of them will therefore be described. Wheelhead 20 comprises motor 21 mounted on a base 22. Base 22 is slidably mounted on suitable rod and antifriction bearings on a second base 23 in a direction tangential to table 90. Base 23 is slidably mounted on a third base 24 which is mounted on machine base 12 and is slidable in a direction toward and away from indexing table 16 in a radial direction normal to the direction of movement of base 23. A combination air cylinder and hydraulic check valve 25 is mounted on base 24 and connected by way of the cylinder 25 shaft to wheelhead 20 base 23, causing base 23 and motor 21 to transverse in the tangential direction when the cylinder is activated. Cylinder and valve 25 provide a rapid return of motor 21 toward cylinder and valve 25 by means of a purely air cylinder operation. In the opposite direction away from the air cylinder and valve 25, the combination of air and hydraulic operation is adjustably set by suitable means and provides a hydraulically controlled forward feed. Wheelhead 20 is disposed at workstation 72 when in the most forward position and is in the rest return position when disposed rearwardly.

To set the radial dimension of the piece part to be worked upon by wheelhead 20, crank 26 is suitably connected to conventional adjustment means attached to base 24 for incrementally transversing base 24 toward and away from table 90 in the radial direction. Mounted to the shaft of motor 21 is disc-shaped diamond grinding wheel 27 which removes material by way of its face as shown.

Wheelhead 30 is constructed similarly as wheelhead 20 except that it is mounted displaced upwardly in the vertical direction with respect to wheelhead 20. Wheelheads 20 and 30 are illustrated in FIG. 1 at the respective workstations 72 and 73.

Wheelhead 40 includes a motor 41 mounted on a support base 42 which is slidably mounted on a second support base 43. The longitudinal axis of the shaft of the motor is normal to base 12. Support base 43 in turn is slidably mounted by suitable rod and antifriction bearings on a third base 44 for transverse motion parallel to base 12 and which, in turn, is mounted on machine base 12. Suitable adjustment means are provided to adjust the position of motor 41 in the normal direction by means of hand crank 45. Connected to base 44 is combination air cylinder and hydraulic check valve 46 whose shaft is connected to base 43. Air cylinder and check valve 46 serves to hydraulically translate motor 41, support 42 and base 43 in the radial direction toward and away from station 74. The air cylinder portion of valve 46 provides rapid return to the outer rearward position and the hydraulic check valve provides adjustable control hydraulic feed of the assembly forwardly toward table 90.

Secured to support 42 is grinding wheel 47 which is rotatably mounted on a suitable shaft driven by a pulley which is belt-driven by a pulley connected to the rotating shaft of motor 41 as shown. Air cylinder and hydraulic check valve 46 drives base 43 in the radial direction toward and away from station 74 in the transverse direction parallel to base 12. The entire assembly comprising base 43, support 42, motor 41, pulley and belt assembly 48 and grinding wheel 47 transverse with respect to workhead 16 in the radial direction.

Wheelhead 50 comprises a motor 51 mounted on a base 52 which is slidably mounted on a second base 53. The shaft of motor 51 is normal to base 12 as shown. Motor 51 and base 52 are caused to incrementally transverse in a normal direction with respect to base 12 by means of crank 54 in a conventional manner. The entire assembly comprising motor 51, base 52 and base 53 are slidably mounted on base 55 by means of conventional rod and antifriction bearings for motion forwardly toward and rearwardly away from station 81. Base 55 is mounted on machine base 12. Mounted on base 55 is combination air cylinder and hydraulic check valve 56 which operates similarly as valves 46 and 25 and whose shaft is connected to base 53. In this case the hydraulic system is adjusted to provide a controlled feed of base 53, support 52 and motor 51 in a radial direction forwardly toward workhead 18. The air cylinder provides rapid return of the assembly away from workhead 18. Rotatably mounted to motor 51 directly beneath the motor as best seen in FIG. 2 is grinding wheel 57. Advantageously all the grinding wheels are provided of the same material, size and discshaped configuration.

Looking from the rear of the motors toward the grinding wheels, all the grinding wheels rotate in a clockwise direction.

Workpiece, Clamp, Align and Drive Assembly

Figure 3:
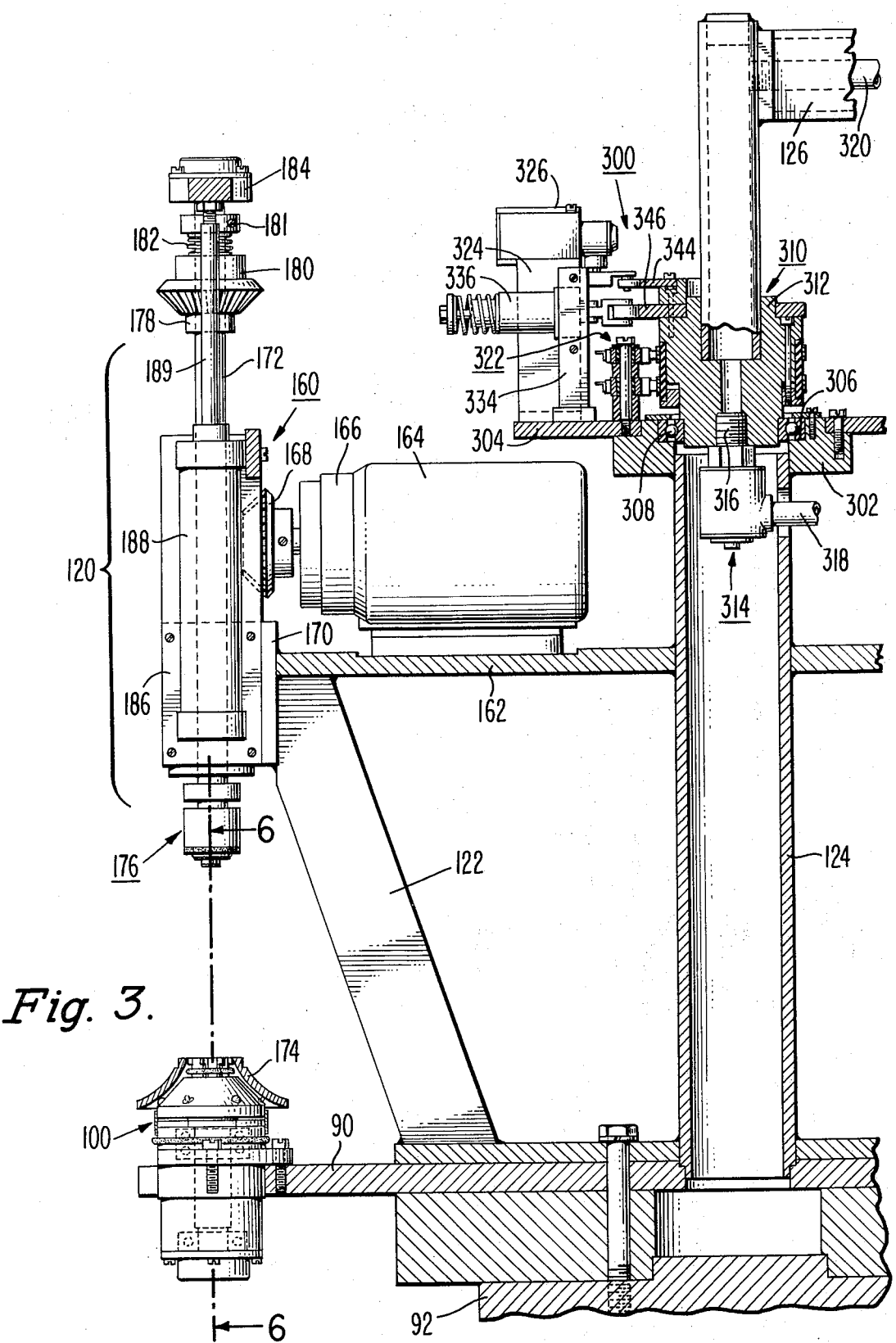

FIGS. 3, 4, 5, 6 and 7 show the details of the workpiece support, align and drive assembly 160. As best seen in FIG. 3, the upper portion of the workpiece align and drive assembly mounted in the superstructure portion 120 of the grinding machine is mounted on base plate 162 which is secured to hollow pipe center post 124 and support struts 122. An assembly 160 is disposed above a corresponding one of workstations 70 through 75 as shown in FIG. 1. Since there are six stations 70 through 75 on workhead 16, there are six assemblies 160.

Mounted on base plate 162 is a suitable workpiece drive motor 164. Plan orientation of motor 164 on plate 162 is best shown in FIG. 3. Gear reduction box 166 is connected to the front end of motor 164 and has spur gear 168 secured to the output shaft of gear reduction box 166.

Figure 4:
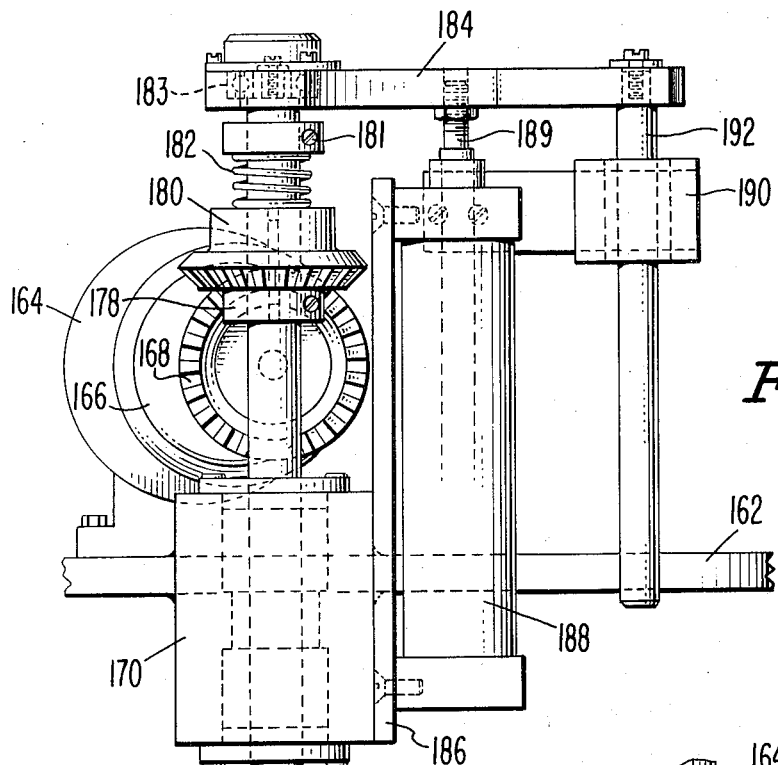
Figure 5:
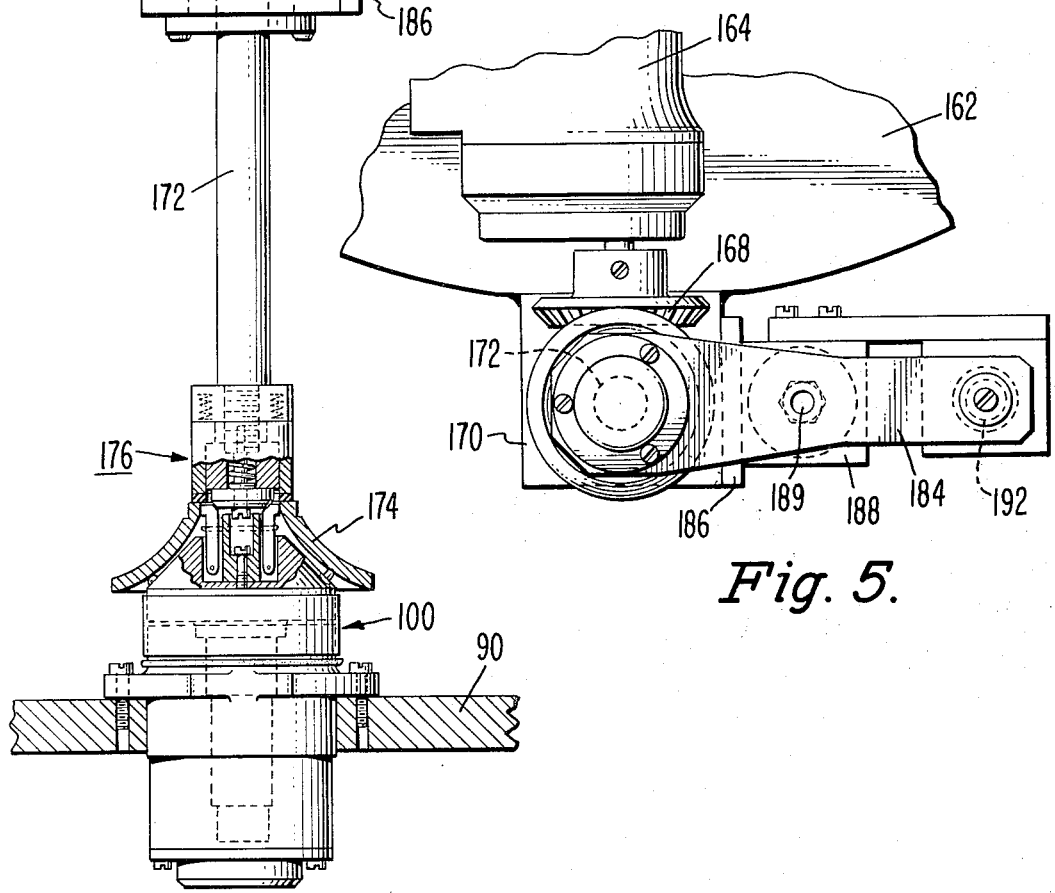

As best seen in FIG. 4, also mounted on plate 162 is bearing box 170 which houses a set of bushings shown in phantom for slidably and rotationally engaging shaft 172. Shaft 172 is oriented normal to table 90 and serves as both a ramrod for both aligning and clamping piece part 174 against nest 100 and for also transmitting rotational power to the piece part for rotating the piece part on nest 100 in a manner to be explained. Secured to the lower end of shaft 172 is align and drivehead assembly 176. Rigidly secured to shaft 172 at the upper end is a locating collar 178 which serves as a stop for spur gear 180 which is slidably keyed to shaft 172 so that gear 180 is driven rotationally by shaft 172 but can slide axially on the shaft. The keyed arrangement between gear 180 and shaft 172 enables shaft 172 to be driven by gear 180 when this gear is rotatably engaged with gear 168 driven by motor 164. Also, rigidly secured to shaft 172 is a second collar 181. Disposed around shaft 172 between collar 181 and gear 180 in a spring 182. Spring 182 serves to resiliently load gear 180 against collar 178 enabling gear 180 to translate axially along shaft 172 toward collar 181. Collars 178 and 181, spring 182 and gear 178 are arranged to form a "Bendix" arrangement.

Shaft 172 is rotatably mounted in antifriction bearing 183 mounted in elongated flat connecting bar 184. At the same time bearing 183 is keyed to shaft 172 such that connecting bar 184 drives shaft 172 upwardly and downwardly normal to table 90. Thus when connecting bar 184 is caused to translate in the up and down direction, rotating shaft 172 is also caused to move in the same direction.

Mounted to gear box 170 is support member 186 which supports air cylinder 188. Shaft 189 of air cylinder 188 is rigidly secured to connecting bar 184 to cause bar 184 to translate in accordance with the position of shaft 189.

To stabilize the transverse motions of shaft 172 about gear box 170 guide support member 190 is provided. Member 190 is secured to support member 186. A suitable bushing is mounted within member 190 and serves as a closely fitting guide for guide shaft 192 which is securely mounted to connecting bar 184 at an end of the bar opposite shaft 172. Thus any lateral vibration transmitted to shaft 172 by the coaction of gears 180 and 168 is resisted by guide shaft 192 and guide member 190. FIG. 3 illustrates shaft 172 in its uppermost position while FIG. 4 illustrates shaft 172 in its most downward position clamped against piece part 174 when the piece part is aligned, clamped and positioned for being rotatably driven by motor 164 by way of gears 168 and 170, shaft 172 and align and drivehead assembly 176. These two vertical positions are also illustrated in FIG. 2.

FIGS. 6 and 7 show the details of the align and drive-head assembly 176 and the align and support nest 100.

Prior to discussing the details of FIGS. 6 and 7 a brief discussion will be made of the type and configuration of the workpiece which is preferably ground by a machine constructed or operated in accordance with the present invention.

Figure 8A:
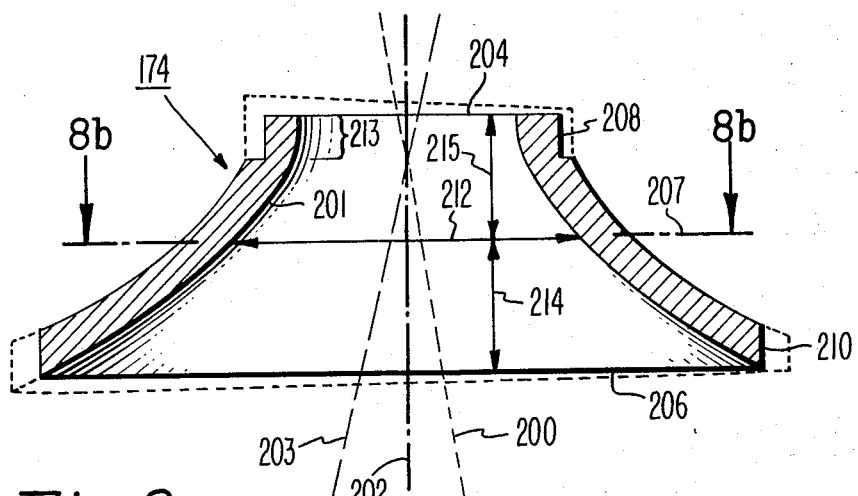

FIG. 8a illustrates a section side elevation view of a typical workpiece 174 in which the dotted lines represent an actual distorted workpiece. The solid lines represent the workpiece after being processed by a machine constructed in accordance with the present invention. This workpiece is of the type formed of ferromagnetic material which is molded by conventional techniques into a generally truncated hollow conical configuration as used for deflection yokes in television receivers. This workpiece while being manufactured is subject, however to uneven stresses which distort the workpiece from its original molded configuration as well known in the art.

Figure 8B:
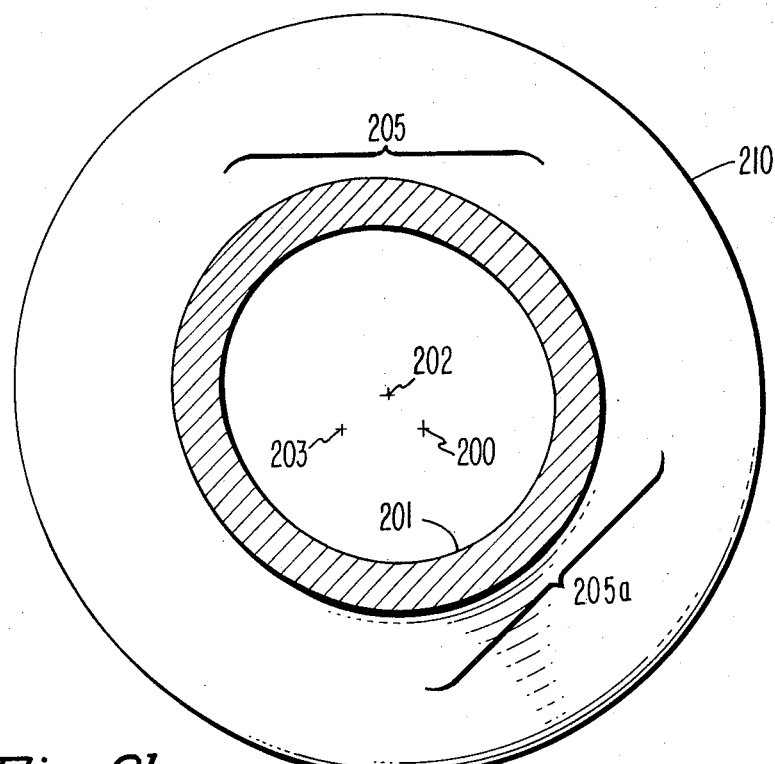

Generally workpiece portion 205 of the side wall, FIG. 8b, extending up to about one half around the periphery of the workpiece is distorted inwardly. The ideal axis of an undistorted workpiece is illustrated by reference line 200 which it will be noted manifests the ideal axis of the undistorted workpiece portion 205a. The axis of the distorted workpiece portion 205 is manifested by reference line 203. Therefore the distorted workpiece has two axes viz, 200 and 203, which correspond to the undistorted 205a and distorted portions 205 of the workpiece, respectively. Mean axis 202 is a compromise between axes 200 and 203. The relative positions of axes 200, 202a and 203 are exaggerated in the drawing for purposes of illustration.

The purpose of the grinding machine constructed in accordance with the present invention is to automatically generate respective end surfaces 204 and 206 planar and normal to mean axis 202 and to generate surfaces of revolution 208 and 210 concentric about mean axis 202. In addition, it is the purpose of this machine to generate surfaces 204 and 206 respective distances 215 and 214 along axis 202 from a particular internal workpiece transverse diameter 212 of predetermined or known length, diameter 212 being substantially normal to axis 202 manifesting the average internal diameter of the workpiece at plane 207.

According to the invention, the workpiece is positioned to substantially precise position on the machine by aligning plane 207 with a machine reference plane. More particularly, as known from the geometry of a cone, any distance along the conical axis is related to a transverse diameter in a transverse plane of the cone. Thus the ends of a typical workpiece can be generated by the machine by locating a transverse reference plane on the workpiece with respect to a reference plane on the machine. The problem thus is to locate transverse plane 207 to a reference machine plane while aligning mean axis 202 to a machine axis for purposes of generating surfaces 204, 206, 208 and 210.

To accomplish this, the workpiece is presumed to be of a predetermined configuration. First, all workpieces have substantially the same configuration. Secondly, inner surface 201 of the workpiece at bracketed area 213 is an annular surface whose center substantially coincides with the intersection of axes 200, 202 and 203. Such a configuration of a workpiece to be processed according to the present invention is typically known and within the skills of the art.

Align and Support Nest and Align and Drive Head

As best shown in FIGS. 6 and 7, align and support nest 100 and align and drive head assembly 176 are shown in detail. The apparatus of FIG. 6 serves to orient, locate, clamp and drive workpiece 174. First nest 100 and then align and drive head assembly 176 will be described. In FIG. 6, workpiece 174 has been processed by the machine, the unprocessed workpiece having the configuration of the workpiece of FIG. 8a and 8b.

Nest 100 includes a generally cylindrical support housing 220 which is mounted with its longitudinal axis 222 substantially normal to indexing table 90 by means of flange 222 which is bolted to table 90 as shown. Formed in housing 220 are annular bearing recesses 224 and 226 each having a bearing support shoulder and inner annular wall for housing a suitable antifriction ball bearing assembly such as ball bearings assemblies 228 and 230 respectively. The axis of rotation of ball bearing assemblies 228 and 230 are substantially concentric with axis 222 and normal to the plane of table 90. The outer race of the ball bearings is rigidly secured to housing 220 while the inner race is free to rotate about axis 222. Ball bearing assemblies 228 and 230 serve to absorb axial thrusts and radial loads from the inner race to the outer race. Ball bearing assemblies 228 and 230 are each respectively axially retained within respective corresponding recesses 224 and 226 by annular bearing retaining caps 232 and 234. Cap 232 is an annular plate which is bolted to housing 220 at the housing upper extremity and arranged to abut against the outer race of bearing assembly 228 with the inner race rotating within the hollow portion of cap 232.

Cap 234 is a generally cylindrical member having a flange which is bolted to the lower extremity of housing 220. Cap 234 abuts against the outer race of bearing assembly 230 permitting the inner race to rotate freely in the inner cavity of the cap.

Disposed in cavity 236 of housing 220 is cylindrical sleeve member 238 which abuts against inner race shoulder 237 of bearing 228 and shoulder 239 of the inner race of bearing 230 as shown for restraining axial movement of the inner race of bearing 230.

Rotatably nested within housing 220 closely fitted to the inner races of bearings 228 and 230 is stepped shaft portion 240 of nest head assembly 242. The lower end of shaft portion 240 is secured to plate 241 which abuts a shoulder of bearing 230 inner race. Plate 241 serves to retain shaft portion 240 from displacing in the axial direction. Head assembly 242 includes truncated conical head portion 244 which is secured at surface 245 to the other end of shaft 240. Rigidly mounted to head 244 are three substantially similar rigid support members 246 and three substantially similar resiliently mounted support members 248. Support members 246 each have a spherical carbide tipped exposed surface. Members 248 also have a carbide tipped spherical support surface.

Members 248 are resiliently supported by spring members having substantially the same spring constant. Disposition of members 246 and 248 on head 244 is best shown in FIG. 7. In FIG. 7 support members 246 are disposed on the same horizontal bolt circle spaced 120° with respect to each other with the centroid of the spherical support surface falling generally on conical imaginary surface of revolution 249. Resilient support members 248 are disposed in a second horizontal bolt circle spaced 120° with respect to each other between member 246 with the centroid of the spherical support surface of the resilient buttons falling substantially on imaginary surface of revolution 249. Support members 248 are so mounted such that they will reciprocate only in a direction to and from the apex 250 of the imaginary surface of revolution 249, members 248 having only 1° of freedom. Imaginary surface of revolution 249 is arranged so as to be substantially normal to the inner surface 201 of the workpiece to be supported by members 246 and 248 at the point of contact with the workpiece.

Resilient members 248 are conventional steel plunger type devices which are threaded into support head 244. Members 246 are rod-like steel members which are fastened to steel head 244 by a screw or like device.

The resilient support plane defined by the intersection of the imaginary surface of revolution 249 with the support surface of members 248, is spaced radially away from apex 250 a distance $X$ from the rigid support plane defined by the intersection of the imaginary surface of revolution 249 at the support surface of members 246.

Distance $X$ is related to the amount of distortion in the workpiece as will be explained later. In accordance with the present invention, resilient members 248 permit workpiece 174 to be tilted substantially about the intersection of axes 200, 202 and 203 when the workpiece is disposed on head assembly 242. If resilient members 248 were not present and workpiece 174 were to sit on rigid members 246 directly, no tilting action of the workpiece 174 occurs due to the opposing normal forces present between the rigid members 246 and the workpiece in the direction of the tilt.

Connected to and extending above the truncated upper portion of head 244 is mandrel assembly 256 which is centered on axis 222. Mandrel 256 includes a hollow cylindrical drive and finger support member 258. Support member 258 is partially disposed in an annular recess formed in the upper truncated portion of head 244 and extends out of the recess.

Six elongated gripping fingers are pivotally mounted to pins 261 at the lower end of support member 258 as shown. Fingers 260 are disposed in a recess formed by member 258 and head 244 sufficiently spaced from members 258 and 244 in the transverse direction to permit fingers 260 to rotate toward and away from axis 222 about pivot pins 261. O-ring 262 or other suitable elastic member is secured around the outer surface of all the fingers as shown which are spaced uniformly about member 258 to resiliently retain the fingers in a mandrel retracted position. Each of the fingers has a cam surface 264 which serves to drive the fingers radially outwardly from member 258 when contacted by cooperating cam member 276 on head 176.

Each of fingers 260 have a gripping head 266 for gripping annular inner surface 213 of the workpiece (FIG. 8a). When fingers 260 are caused to grip workpiece 174, mean axis 202 of workpiece 174 is oriented to substantially intersect axis 222 since the mandrel assembly 256 is centered about axis 222. The outer gripping surface of the gripping head 266 is preferably provided slightly convex to provide point contact on surface 213.

Mandrel assembly 256 is secured to head 244 by a bolt as shown. Cylindrical inner cavity 268 is provided member 258 to serve as a guide for align and drive head assenbly 176.

Assembly 176 is fastened to shaft 172 of the workpiece align and support and drive assembly 160. Threaded to shaft 172 at its lower extremity and centered about axis 222 is bushing 270. Bushing 270 has an outer cylindrical surface which slidably engages in the axial direction clamp align and drive sleeve 272. Sleeve 272 has an upper transverse flange 273 which abuts a mating shoulder on bushing 270. Threaded to shaft 172 at its lower end is guidepin 274. Pin 274 is disposed in cylindrical recess 275 formed in the lower portion of bushing 270 and formed by sleeve 272 which extends downwardly from bushing 270.

Closely and slidably secured to guidepin 274 is disc-shaped mandrel cam 276. Cam 276 has a chamfered cam surface 277 which cooperates with chamfered cam surface 264 on fingers 260 for rotating the fingers outwardly when cam 276 is axially displaced against fingers 260. Member 276 is slidably and resiliently mounted to guidepin 274 and retained by the slotted guidepin head. Cam 276 is disposed within recess 275. When shaft 172 is fully axially displaced against nest 100, cam member 276 is resiliently retained.

Sleeve 272 is resiliently coupled to shaft 172 in the axial direction by way of annular member 278 which has four cylindrical recesses therein in which are respectively inserted four coil springs 280 which abut flange 273. Annular member 278 has a substantially rectangular cross section, is disposed between shoulder on shaft 172 and a shoulder on bushing 270 and is compressively retained in the axial direction by these two members. Axial force transmitted by shaft 172 is therefore transmitted to annular member 278. Springs 280 serve as shock absorbers for sleeve 272 when sleeve 272 is forced in the axial direction against workpiece 174.

A rubber washer 282 is suitably bonded to surface 284 of sleeve 272. Surface 284 serves as a drive ram for axially displacing and tilting workpiece 174 by way of workpiece surface 204 (FIG. 8a), is substantially planar and is disposed normal to axis 222. Rubber member 282 is suitably constructed to provide uniform contact with surface 204 when sleeve 272 is forced toward workpiece 174 in the downward position, surfaces 284 and 204 (unprocessed) being tilted with respect to each other during the grind operations. Further, rubber member 282 serves to provide high frictional connection between head 176 and workpiece 174 to rotationally drive workpiece 174 when shaft 172 is rotated by motor 164.

In orienting mean axis 202 (FIG. 8a) to align with machine axis 222, cam 276 is guided by pin 274 and guide hole 268 and first contact fingers 260. Fingers 260 grip the neck of the workpiece in a substantially transverse (horizontal) plane and center the workpiece about axis 222. However, as previously described, means axis 202 of inner surface 201 of the workpiece is substantially concentric with inner surface 201 at bracketed area 213 which is gripped by fingers 260 and thus, mean axis 202 intersects axis 222. At this time, axis 202 may be in a tilted orientation with respect to machine axis 222. If tilted, resiliently mounted members 248 provide unequal forces against workpiece 174. Axial translational displacement of member 282 against workpiece 174 applies a torque to workpiece 174 due to these unequal forces.

At the same time the workpiece is being tilted into alignment with axis 222, the workpiece is axially displaced along axis 222. This axial displacement continues until the workpiece inner surface 201 abuts at least one of rigid members 246. It is to be understood that when workpiece surface 201 is out of round, it is possible for only one of the rigid members 246 to contact inner surface 201. In this instance, according to the present invention, mean axis 202 of workpiece 174 is aligned with axis 222.

Rigid members 246 define a machine reference support plane by way of bolt circle 252, FIG. 7 and plane 252' of FIG. 6. Circle 252 is one whose radius extends normal to and outwardly from the axis of imaginary surface of revolution 249 to the workpiece contact point on members 246 which abut inner surface 201 of the workpiece. The transverse plane 252' defined by bolt circle 252 is the machine reference support plane which positions plane 207 in the axial direction. It has been found that a workpiece having the geometry described can be positioned on the machine so that diameter 212 in plane 207 is predictably aligned on the machine in each of a large plurality of like piece parts having dimensional variations typical for this type of workpiece. That is, plane 207 of FIG. 6 is predictably disposed with respect to plane 252' so that surfaces 204 and 206 of the workpiece (FIG. 8a) can be precisely generated by the machine with respect to plane 252', and, thus, plane 207. As shown in FIG. 6, plane 207 is disposed parallel to and axially spaced from plane 252'. The axial distance of plane 207 to plane 252' is determined by calibration from the initial workpiece processed by the machine. It is to be understood that the precision in positioning reference plane 207 of the workpiece with respect to bolt circle 252 (plane 252') of the machine is a function of complex relationships which include the geometry and variations from piece to piece of the workpiece, geometry of the support nest including the location of bolt circles 252 and 254 with respect to the workpiece and their spacing distance $X$, the type and amount of distortion in the workpiece, the rate of travel and applied forces of the align and drive head assembly, surface friction between members 246 and 248 and the workpiece and other factors all of which are generally related to the mechanics and kinematics of nest 100, head 176 and workpiece 174. Not withstanding the difficulty of determining these complex relationships, the design parameters for positioning the workpiece to the machine can be determined experimentally as will be apparent to those skilled in this art.

In an actual ferromagnetic workpiece processed according to the present invention, fixed members 246 define a bolt circle 252 (FIG. 7) suitably about 4 inches in diameter, the workpiece or core having suitably a 1¾ inch height, a surface 208 diameter of approximately 2 inches and a surface 210 diameter of approximately 5 inches. During the alignment, the core is axially displaced downwardly approximately 0.045 inches and axis 202 is shifted by the tilting action 0.066 inches at surface 206 in a lateral direction about the intersection of axes 202 and 222, the core having an 0.135 inch out of round condition at surface 210. In this example, resilient support members 248 are spaced distance $X$ one-sixteenth of an inch and, therefore, will be displaced toward apex 250 (FIG. 7) approximately one-sixteenth of an inch (distance $x$ being a minimum one-sixteenth of an inch). Internal diameter 212 is about 4 inches (FIG. 8a) and is axially spaced about 0.2 inches from surface 206 (distance 214).

Power Interconnecting Assembly

Figure 9:
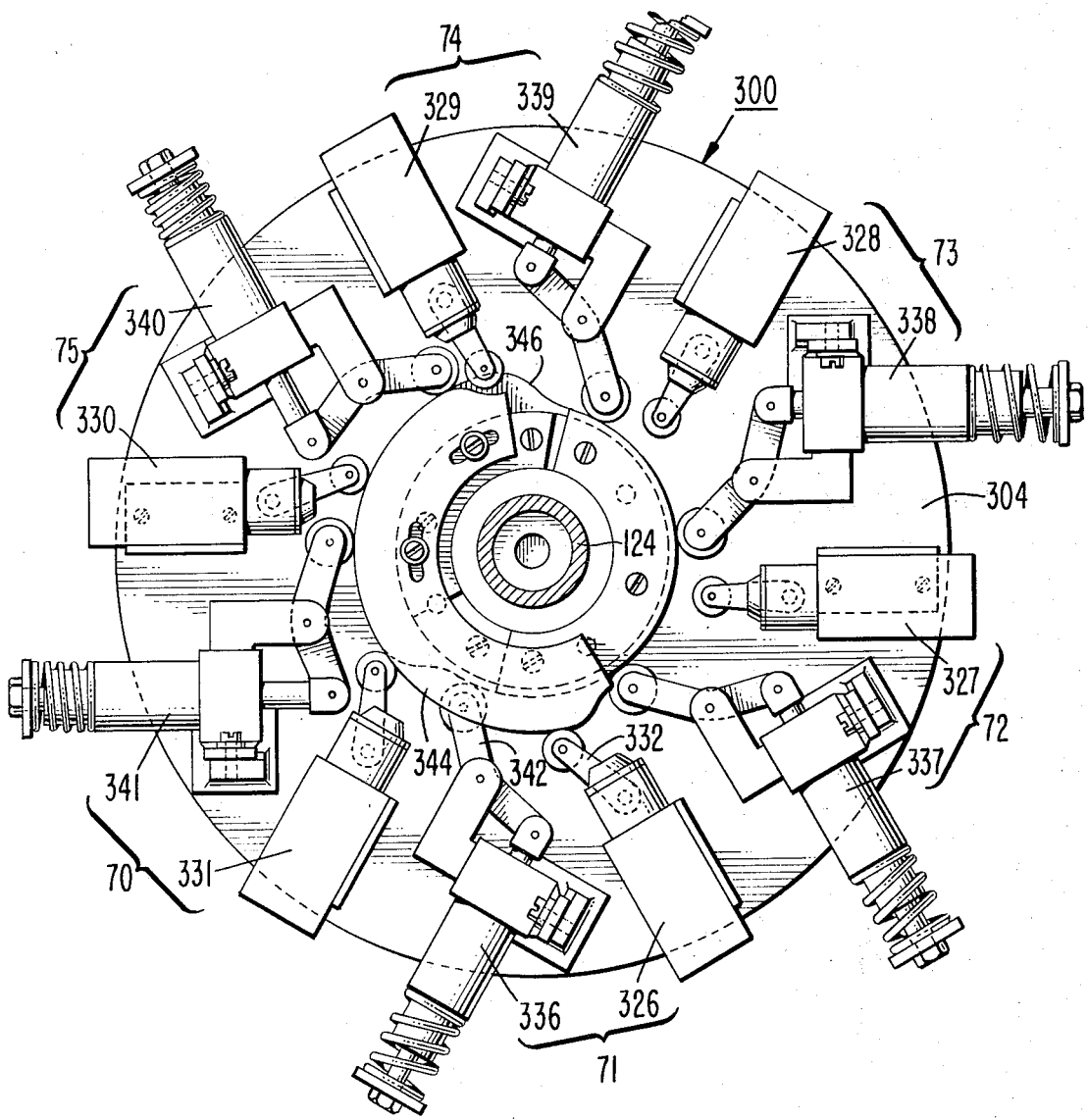

Power interconnecting assembly 300 is best shown in FIGS. 3 and 9. Assembly 300 is located in superstructure 120 and interconnects air and electrical power between the stationary portion of the machine as exemplified by post 126 to the rotating portion as exemplified by superstructure 120. As indicated previously, the entire superstructure rotates about the longitudinal axis of center post 124. Therefore, means must be provided to interconnect motors 164 and air cylinders 188 with a stationary supply in addition to means for controlling the timing and direction of their motions. The motions controlled are the up down action of air cylinder shaft 189 and rotation of gear 168.

Assembly 300 is supported by post 124 by way of annular support member 302 fitted around post 124. Support member 302 in turn supports assembly 300 base plate 304 which is suitably fastened to member 302. Member 302 includes a bearing recess 306 for housing suitable annular antifriction bearing 308 which is suitably retained against member 302. Secured to support arm and post 126 at the lower depending extremity thereof is armature and cam assembly 310. Closely fitted to post and arm assembly 126 is support member 312 of assembly 310. Support member 312 is a generally cylindrical member having an axial cavity and is closely fitted around the periphery of vertical cylindrical portion of post 126 as shown. Threaded to post 126 at the bottom of support member 312 is air valve assembly 314. Assembly 314 is a conventional device having a swivel elbow for supplying air by means of a slip ring configuration at a fixed inlet conduit 316 to outlet conduit 318 which rotates with superstructure 120. Inlet member 316, support member 312, and support arm and post 126 are stationary while annular support member 302, base plate 304 and outlet conduit 318 rotate about the longitudinal axis of center post 124.

The vertical portion of post 126 is a sealed cavity for carrying pressurized air to air valve assembly 314. Coupled to the vertical portion is an internal assembled conduit 320 which is connected at the other end (not shown) to suitable air pressure supply means. Thus pressurized air is supplied via conduit 320, post 126, member 312, inlet conduit 316 and rotating outlet conduit 318. Pressurized air from conduit 318 is supplied to air cylinder 188 as will be explained.

Electrically isolated from member 312 are a pair of annular armature rings mounted on armature assembly 322. Assembly 322 includes annular electrical conductive rings secured in electrical isolation to member 312 and appropriate electrical brushes as shown which permit transfer of electrical power from the stationary portion of the machine as exemplified by arm and post 126 to the rotating portion as exemplified by base 304 and base plate 162. Suitable electrical conductors (not shown) are coupled to the brushes of assembly 322 for connection to the various devices on the rotating portion of the machine.

Mounted on base plate 304 is switch support post 324 to which is secured a limit switch assembly 326. Dispersed around center post 124 as shown in FIG. 9 are six such limit switch assemblies 326 through 331. All of these switch assemblies are substantially the same and therefore a description of one will be sufficient for describing them all.

Connected to assembly 326 is cam follower 332 for placing the limit switch in either an open or closed switch position.

The switching action of limit switch 326 causes motor 164 to be either on or off in accordance with the switch condition.

Also secured to base plate 304 is a second support post 334 to which is secured air valve assembly 336. Dispersed around the periphery of post 126 as shown in FIG. 9 adjacent to each of switch assemblies 326 through 331 are six air valve assemblies 336 through 341, respectively. Each of air valve assemblies 336 through 341 are substantially the same and therefore a description of one will be sufficient. Secured to air valve assembly 336 is cam follower 342. Cam follower 342 serves to switch pressurized air from one conduit path to another as known in the air valve art. The switching action of air valve 336 causes air cylinder 188 to displace shaft 172 toward or away from nest 100 in accordance with the switch position of the air valve. Suitable conduit means (not shown) connect air valve 336 to air cylinder 188 and conduit 318. Similar action and connections take place between each of the remaining air valves and the corresponding air cylinders located at each of the stations 70 through 75 of FIG. 1.

Thus head assembly 176 and motor 164 are, respectively, either in the up or down position or on or off at each of stations 70 through 75 in accordance with the switch condition of air valve 336 and limit switch 326. Limit switch 326 and air valve 336 form a switch pair that correspond to one of stations 70 through 75. In this case switch 326 and air valve 336 correspond to station 71. Similarly, air valve 337 and limit switch 327 correspond to staion 72 and so on around the periphery each adjacent air valve and limit switch corresponding to a separate and different one of the stations on workhead 16.

As shown in FIGS. 3 and 9 upper cam 344 serves to open and close respective limit switches 326 through 331 by way of cam followers such as followers 332. Directly beneath cam 344 is a second cam 346 which serves to switch the state of the air valve assemblies 336 and 331 by way of corresponding cam followers such as cam follower 342 of air valve assembly 336.

As shown in FIG. 9, the switch position of air valve assemblies 340 and 341 are such as to maintain shaft 172 in its uppermost position. Thus, shaft 172 is always in a raised position when it is disposed over stations 70 and 75. In all the other stations, it is in the lowered or downward position. FIG. 3 illustrates the upward position and FIG. 4 illustrates the downward position.

Referring again to FIG. 9, limit switches 330, 331 and 326 are illustrated in their open condition whereas the corresponding motor 164 is not running. The remaining limit switches are in the closed position and the corresponding motors 164 are running. Thus, motors 164 positioned at stations 72, 73 and 74 are on while those motors positioned at stations 75, 70 and 71 are off.

Transfer Mechanism

The transfer mechanism is shown in detail in FIGS. 10 and 11. FIG. 10 shows a sectional front view of the transfer mechanism 60 with the upper arm assembly 350 swung around to the right over workstation 75 to show a side elevational view of the upper arm assembly.

Transfer mechanism 60 includes cubical housing 352 which is mounted to base 12. Mounted inside housing 352 is air cylinder 354 which is positioned in a vertical upstanding orientation so that its shaft displaces axially upward and downward with respect to base 12. Secured to the shaft of air cylinder 354 is transfer shaft 356. Shaft 356 is mounted in a suitable bushing 358 which is secured in upper cubical housing 359 mounted on top of lower housing 352. Threaded into the upper portion of housing 352 is guide pin housing 360 for guiding an axialy displaced guide pin 362. Housing 360 has a cavity which receives guide pin 362 when shaft 356 is in its downward vertical position.

Bushing 364 is secured to the base of housing 359 adjacent bushing 358 and serves to precisely locate guide pin 362. Pin 362 is secured in its upper end to bracket 366 which in turn is securely fastened to shaft 356. When shaft 356 is in its uppermost position, the bottom edge of guide pin 362 clears bushing 364 permitting guide pin 362 and shaft 356 to be rotated about shaft 356 longitudinal axis. Secured immediately above bracket 366 to shaft 356 is spur gear 368 which is axially and rotationally keyed to shaft 356 so that the gear and shaft rotate in unison. Secured to the upper plate of housing 359 is bushing 370. Bushings 358 and 370 serve to slidably and rotatably engage shaft 356. Secured to the upper extremity of shaft 356 is upper arm assembly 350.

Upper arm assembly 350 includes support bracket 372 which is a support platform which extends horizontally outwardly from shaft 356. Mounted on the upper surface of the support platform of bracket 372 is air cylinder 374.

Air cylinder 374 is mounted so that its shaft reciprocates in a radial direction from shaft 356. The shaft of air cylinder 374 has an extended or retracted position and is fastened to linkage member 376 which is yoke-shaped and has two pivotally mounted links 378 and 380 mounted thereto for pivoting in a transverse direction about a vertical axis. Pivotally secured to the other end of links 378 and 380 for pivoting about a veritcal axis are elongated jaws 382 and 384. Jaws 382 and 384 extend radially away from shaft 356. Pivotally coupled to the jaws is pivot bar 386 which is rigidly fastened to support bracket 372 as shown. Thus when the shaft of air cylinder 374 is caused to be in its retracted position, links 378 and 380 are caused to exert forces on jaws 382 and 384 such that the outer extremities of the jaws transverse toward each other clamping a workpiece disposed between the jaws. Conversely, when the shaft of air cylinder 374 is in its extended position links 378 and 380 cause jaws 382 and 384 to pivot in the opposite direction spreading the jaws apart and releasing the clamped workpiece. To prevent marring the finish of a finished workpiece, a pair of suitable inserts 387 and 388 are secured to jaws 382 and 384.

Mounted within housing 359 is gear rack slide member 393 which serves as a support and guide for gear rack 392 which is slidably secured to guide 390. Rack 392 is mounted to transverse into and out of the drawing by means of an air cylinder 394 shown in phantom.

With shaft 356 in a downward position toward base 12, guide pin 362 is precisely located in bushing 364 thereby precisely locating jaws 387 and 388 over the center of workstation 75 with the workpiece 174 disposed centrally between the inserts 387 and 388. Air cylinder 354 then translates shaft 356 upwardly to lift piecepart 174 off nest 100. Air cylinder 390 then translates rack 392 which at this time engages gear 368 as shown in phantom and rotates the upper arm assembly 350 to the position shown in FIG. 11 and in phantom in FIG. 10. The piecepart is at this time located over workstation 80 on workhead 18. In the meantime air cylinder 374 opened and closed the jaws when applicable to grasp and release the piecepart.

ELECTRICAL CIRCUITRY

Figure 12:
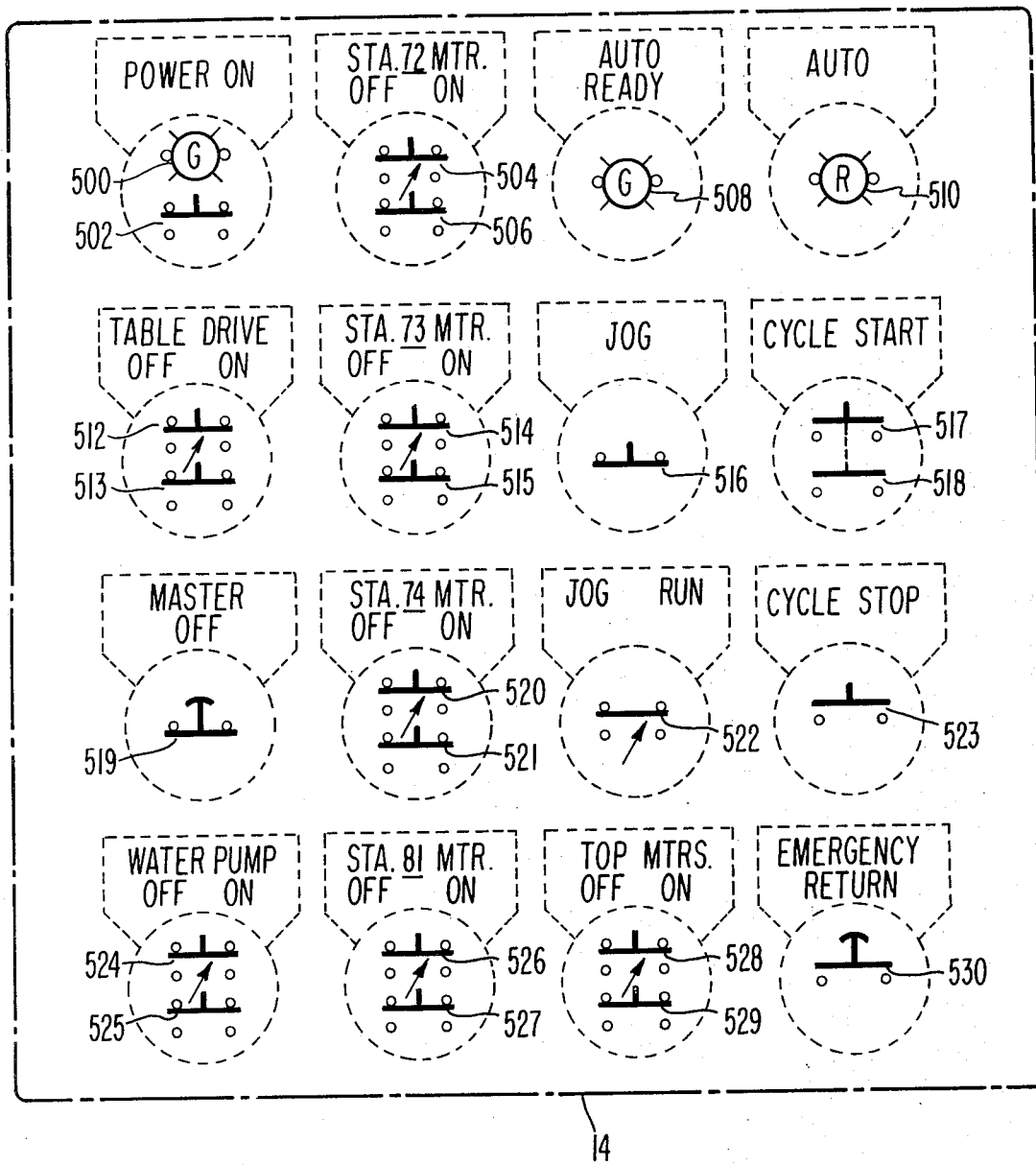
Figure 13:
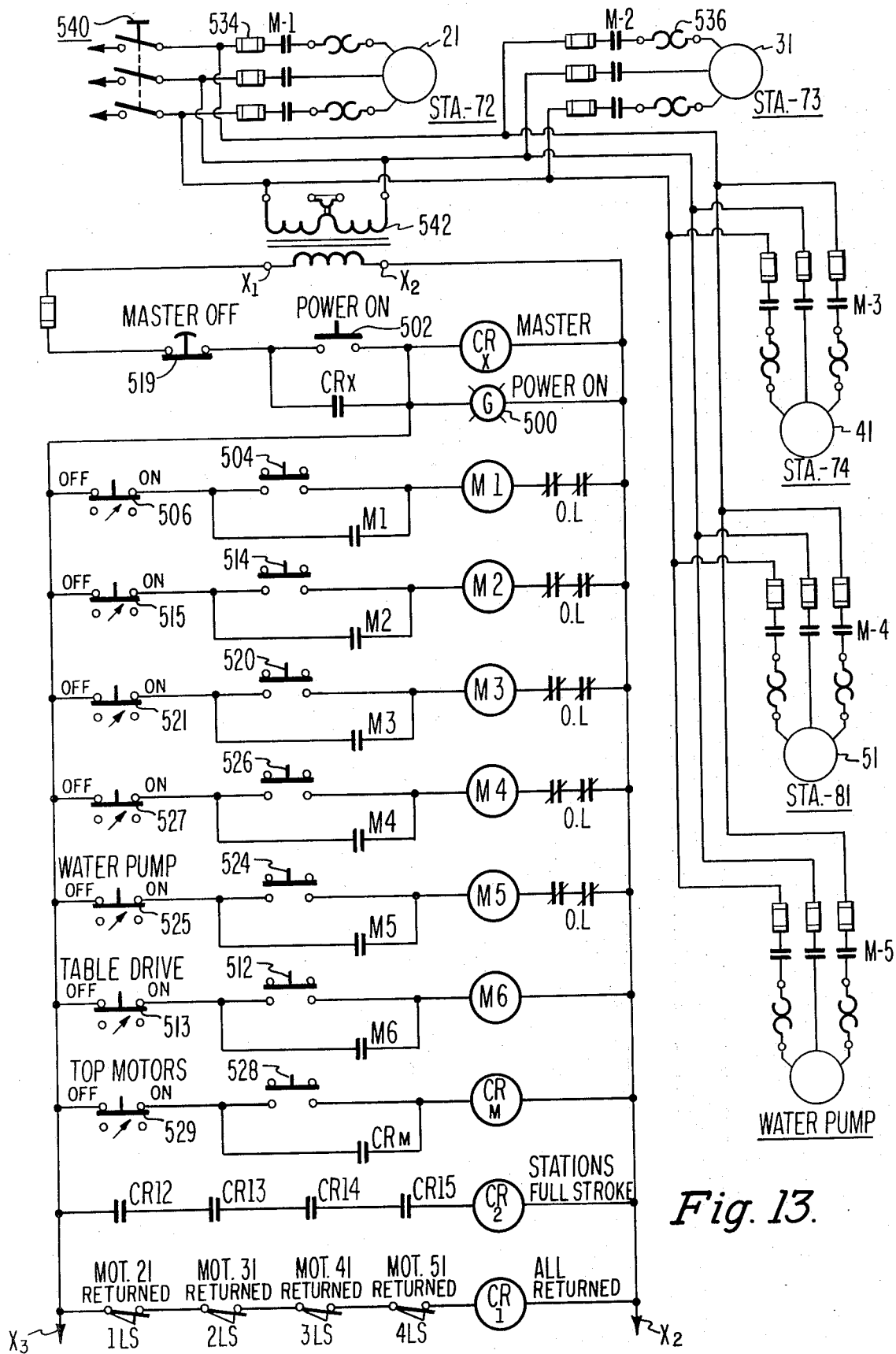

FIG. 12 is a front elevational view schematically showing control panel 14 in which the various indicator lights and switches are arranged in horizontal rows across the face of the panel. Commencing with the upper left hand corner of the control panel, there is a power on indicating light 500 and push button switch 502, station 72 motor push button switch 502 and selector switch 506, automatic ready indicating light 508 and automatic indicating light 510. In the next row there is table drive push button switch 512 and selector switch 513, station 73 motor push button switch 514 and selector switch 515, jog push button switch 516 and cycle start ganged push buttons 517 and 518. In the next row is master push button switch 519, station 74 motor push button switch 520 and selector switch 521, jog-run selector switch 522 and cycle stop push button switch 523. In the last row is water pump push button switch 524 and selector switch 525, station 81 motor push button switch 526 and selector switch 527, top motor push button switch 528 and selector switch 529 and emergency return push button switch 530.

In FIGS. 13 through 16 the electrical circuitry of the machine of the present invention is shown with each of the figures showing a different portion of the same circuitry. The terminals indicating the interconnection of the circuitry of each figure with the other figures is indicated by terminals designated $X_1$, $X_2$ and $X_3$. The interconnections of the various components of FIGS. 13 to 16 are self-evident from the drawings and no detailed description of this interconnection will be repeated here. However, a brief description will be given of the various components shown in the schematic.

As in the case of relays, standard nomenclature will be used, the relays having the letters CR standing for control relay and those using the letter M standing for a motor relay. The coil, the normally open contactors and the normally closed contactors are shown in a conventional manner. Air valve solenoid coils are lettered SVA or SVB. The SVA designation indicates that that coil activates the associate air valve in a direction opposite to the direction of the coil labeled SVB. Additionally, the coils are all labeled with a prime and double prime number. The same number without the prime corresponds to the associate air cylinder which the prime numbered coil relates to. For example, coil 394' labeled 1SVA is a coil which activates air cylinder 394 of FIG. 10. Coil 394'' activates air cylinder 394 in the opposite direction as to coil 394'. Similarly, all the prime and double prime numbers of the solenoid coils relate to air cylinders without the primes or double prime designation. Letters CS refer to a cam actuated switch. Letters LS refer to a limit switch. Letters OL refer to an overload device. Fuse 534 is typical of the many safety fuses included in the circuitry.

It should also be noted that suitable thermal overload devices 536 are provided the several motors as shown.

Figure 14:
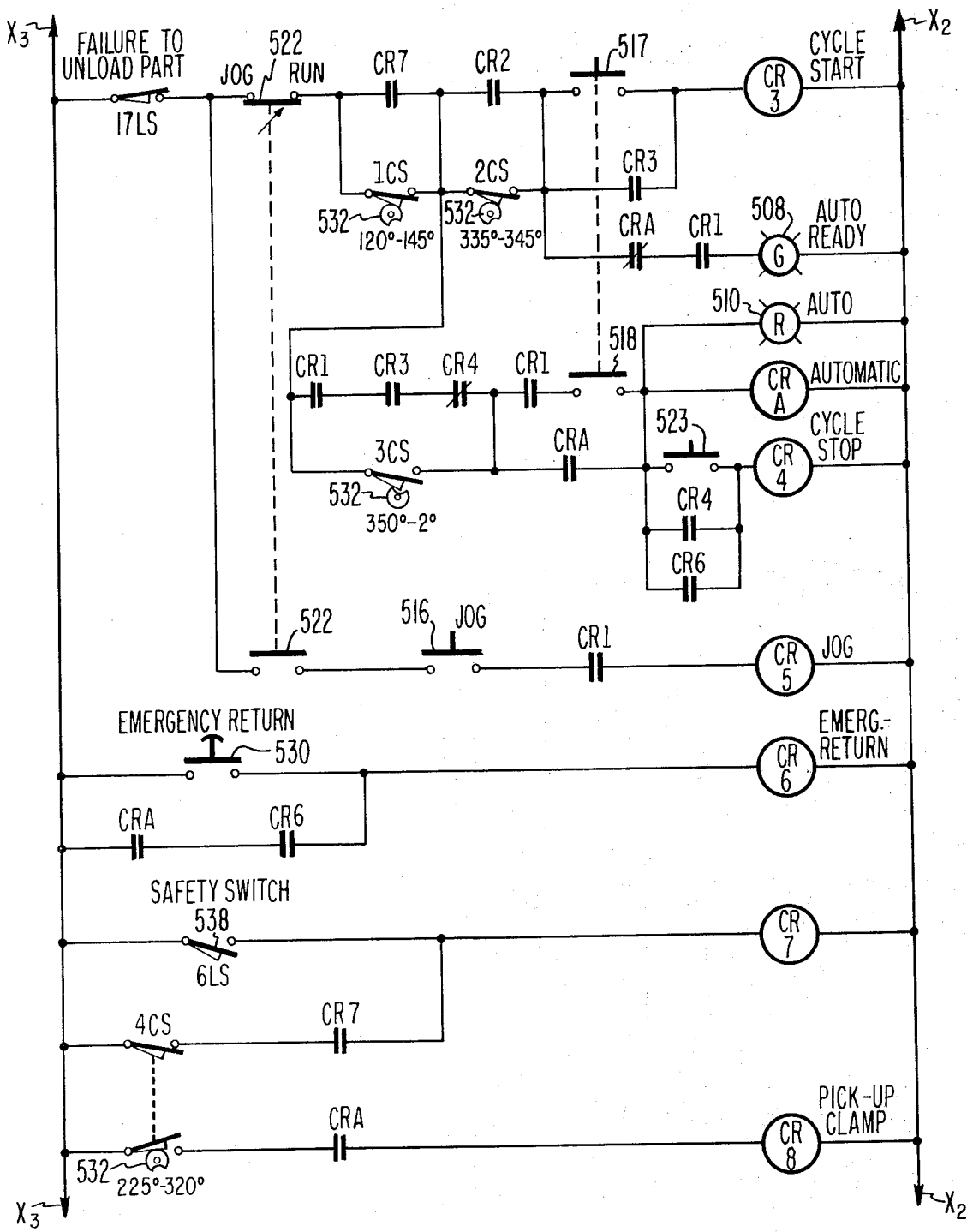
Figure 15:
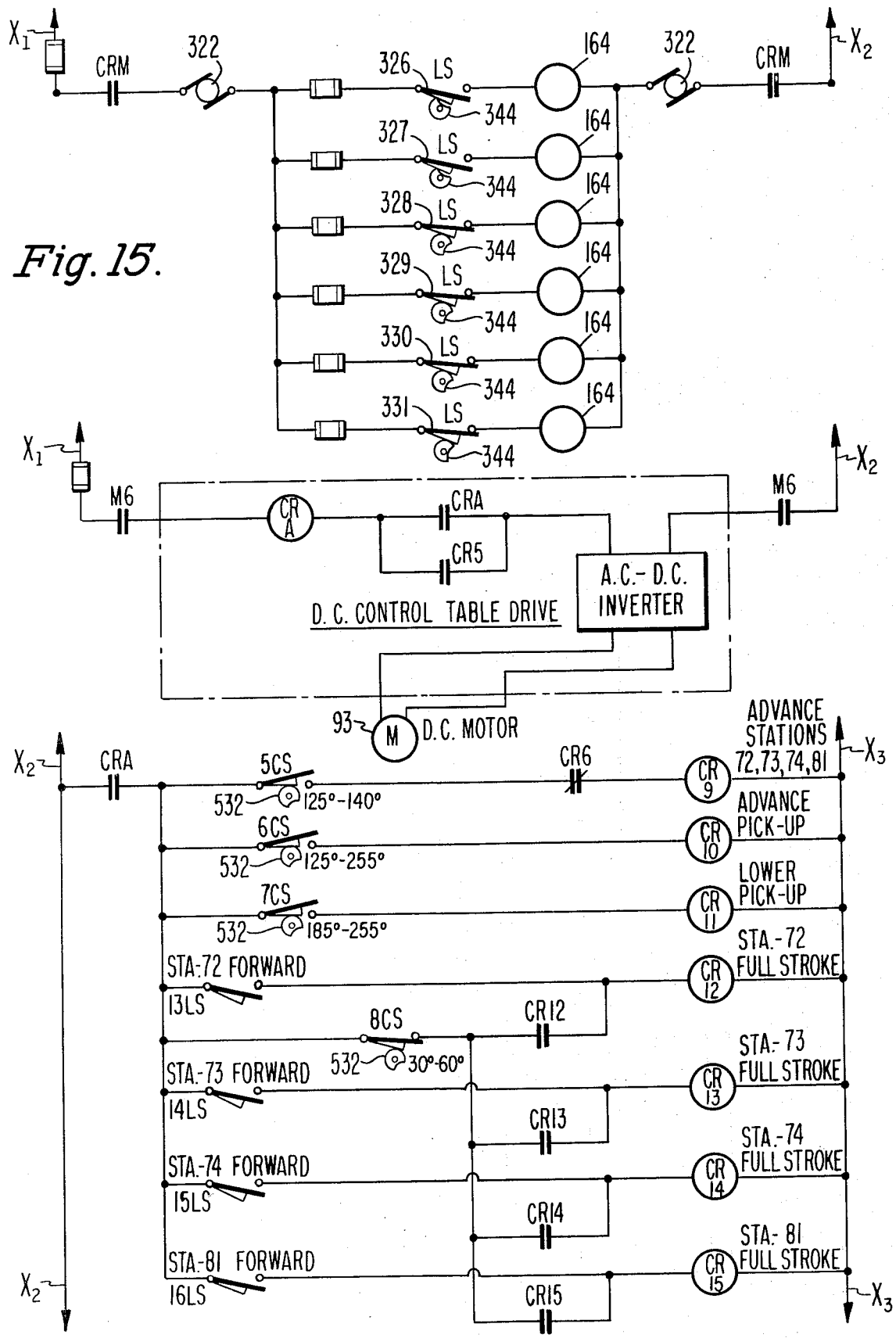
Figure 16:
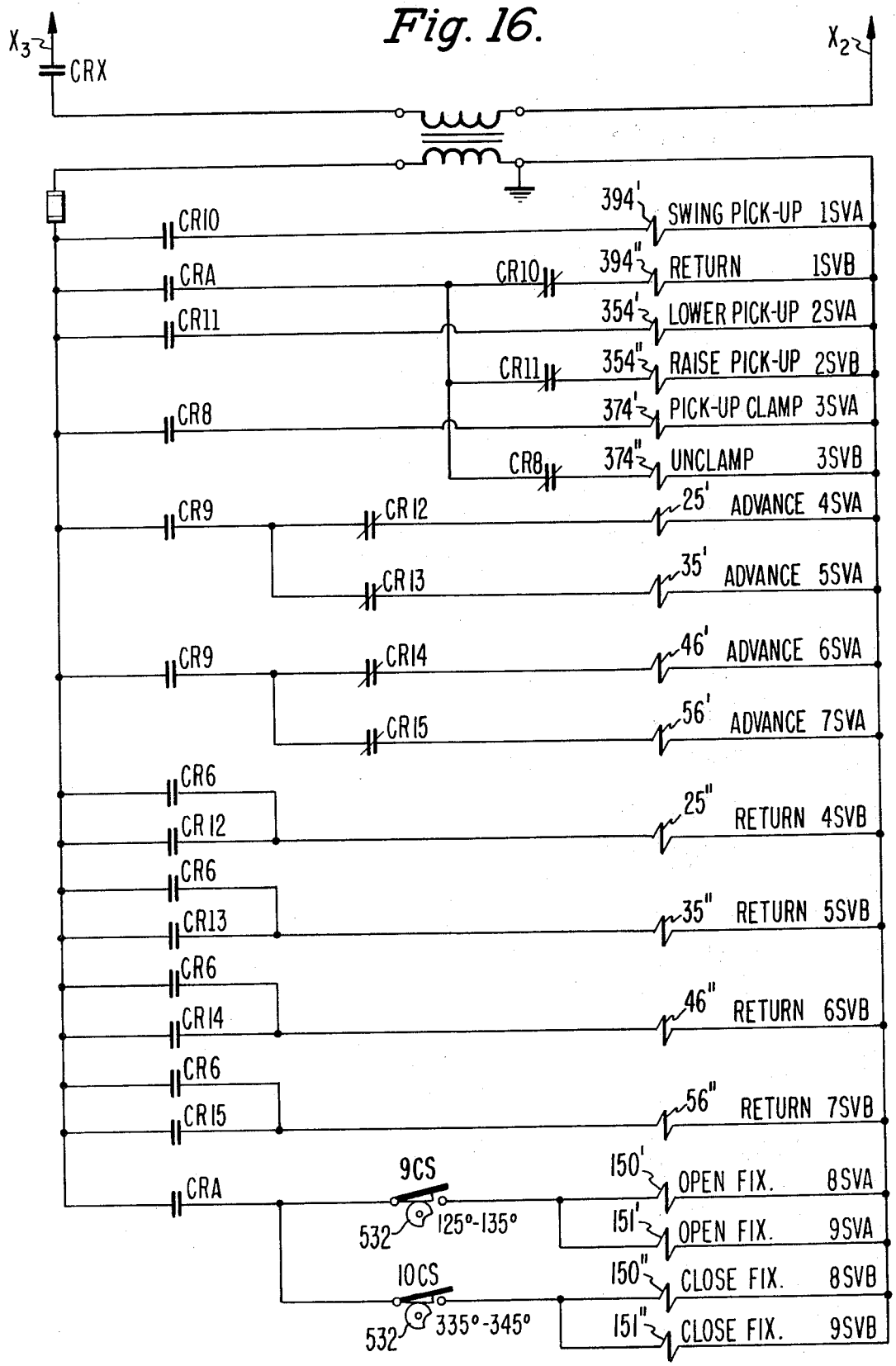

Adjacent to each of the cam switches 1CS through 10CS is cam 532. Cam 532 has ten cam segments, each segment corresponding to a different one of the cam switches. Cam 532 serves to open and close each of the cam switches during a portion of each revolution of the cam as indicated by the angular notation adjacent that cam segment. For example, cam 2CS of FIG. 14 is open only during the 335° to 345° portion of the rotation of the cam. In contradistinction, cam 10CS of FIG. 16 is closed during this same angular portion. Cam 532 and the corresponding cam switches were mentioned above in conjunction with the description of the grinding machine with respect to FIG. 2 wherein it was stated that the cams are driven by indexing head 92 but not shown in FIG. 2. A suitable timing chain, not shown, is coupled to linkage 134 which rotationally drives cam 532.

Operation of the Machine

Pressurized air is supplied to the various air cylinders by suitable means as described above. Positioned between stations 80 and 83 of workhead 18 of FIG. 1 (not shown) is limit switch 17LS of FIG. 14. This limit switch detects the presence and absence of the workpiece on the machine and serves to stop the operation of the machine should an operator fail to unload the workpiece in station 83. A second limit switch 538 is positioned at station 71 to sense the downward position of head 176. This serves to shut the machine off should head 176 not be seated at its downward position.

First the master switch is closed. Secondly, all selector switches 506, 513, 515, 521, 525, 527 and 529 are placed in the on position. Jog run switch 522 is placed in the jog position. Referring to FIG. 14, the jog position of switch 522 opens the switch between switch 17LS and CR7 and closes the switch between 17LS and jog switch 516. With selector switch 522 in the jog position the machine cannot be run except when spring loaded jog push button 516 is depressed. The machine will continue to run as long as jog switch 516 is depressed. Main power switch 540 is also placed in the closed position.

To place the machine in the on condition, power on switch 502 is depressed first. This energizes master relay CRX and closes contactors CRX and turning on the green indicator light, and results in power being applied across terminals $X_2$ and $X_3$. Table drive pushbutton switch 512 is then depressed closing the contactors of M6 of FIG. 13. However, d.c. motor 93 of FIG. 15 which drives indexing head 92 will not be energized unless contactors CRA or CR5 are closed. Water pump switch 524, grind station motor switches 504, 514, 520 and 526 and top motors switch 528 are depressed to energize motors 21, 31, 41 and 51, the waterpump coolant motor and top motors 164. Of course those motors 164 which will be actually energized at any given time will depend on the open or closed switch position of switches 326 through 331.

With no workpieces in the machine, jog switch 516 is now depressed. For as long as switch 516 is depressed an operator can visually observe the operation of all the components on the machine to ensure proper operation prior to insertion of the workpiece into the machine. An operator once having satisfied himself that the machine is operating properly, switches jog-run switch 522 to the run position. This turns on the automatic ready green light provided the following conditions are present.

Motors 21, 31, 41 and 51 must be in the return position. That is referring to FIG. 1, motor 21 must be transversed toward cylinder 25 until grinding wheel 27 is displaced from workstation 72. Similarly motor 31 is transversed to the right toward cylinder 35 until grinding wheel 37 is displaced from workstation 73. With respect to motor 41, this motor must be radially displaced away from station 74 toward cylinder 46 in its most rearward position. In this position grinding wheel 47 will be radially displaced away from station 74. With respect to motor 51, this motor is also radially displaced in a direction away from station 81 toward cylinder 56. Limit switches 1LS through 4LS of FIG. 13 sense the return position of motors 21, 31, 41 and 51 as just described. When all motors are in this return position contactor CR1 is closed. In the initial position cam switches 1CS and 2CS are also closed thus permitting the automatic ready light 508 to go on. Thus the green light indicates that all the grind motors are in the position displaced from the appropriate workstation so that if a workpiece were in the workstation the grinding wheels would not contact that workpiece. At this time the operator presses the cycle start switch 517 and 518. This starts the machine cycling.

The term cycle will be best understood upon a further description of the operation of the machine. In the cycle operating mode the machine will continue to run regardless of the presence of the piece part at any of the workstations. Each motor in every function will operate normally. This operation will continue until the cycle stop button is depressed. At this time the CR4 relay will be energizing closing contact CR4 bypassing CR8 relay and shutting off the machine.

With the machine in the automatic mode, indexing head 92 is caused to cyclically rotate by motor 93 and the Geneva mechanism of indexing head 92 rotates linkage 134 causing the Geneva mechanism of indexing head 132 to also cyclically rotate. By cyclically rotate is meant indexing table 90 is caused to rotate such that nests 100 are each positioned at one of workstations 70 through 75. So positioned indexing table 90 dwells for a period of time so that the grinding operation may occur. During this dwell period, the operator places a workpiece at station 70 on nest 100 and removes a workpiece from station 83 on workhead 18.

At the beginning of the cycle, the operator first places the workpiece on nest 100 at station 70. During this dwell period align and drive head assembly 176 as seen in FIG. 3 is caused to be pulled downward by air cylinder 188 by way of air valve assembly 336. When shaft 172 is in its fully downward position, gear 180 engages gear 168. However, motor 164 is in the off position as determined by cam 344 and limit switch assembly 326. This downward position of shaft 172 is best seen in FIG. 4. Presuming that workpiece 174 is disposed on nest 100 at workstation 71, mandrel cam member 276 on head 176 first engages mandrel fingers 260 spreading the fingers apart and grasping the inner surface of workpiece 174 neck. Shaft 172 continues in its downward motion causing rubber member 282 to engage workpiece surface 204 (FIG. 8A).

Shaft 172 continues its axial displacement simultaneously tilting and axially displacing the workpiece until inner surface 201 of workpiece 174 abuts against at least one of rigid support members 246 clamping the workpiece to members 246.

Shaft 172 is now fully seated in the downward position. Once shaft 172 is in its fully seated position limit switch 6LS identified as 538 in FIG. 2 when closed indicates this downward position of head 176. Table 90 then dwells in this indexed position until the next cycle. In the next cycle the workpiece positioned in nest 100 of station 71 is positioned by table 90 to station 72. In this position cam 344 (FIGS. 3 and 9) closes limit switch 326 causing motor 164 station 72 to operate. When this occurs gear 180 rotationally drives shaft 172 and the rotational drive is transmitted to head 176. Head 176 in turn rotates workpiece 174 on nest 100. Motors 164 are all alike and are typically one-third horsepower, 420 RPM motors which are speed reduced two to one at the output thereof.

Thus the workpiece is caused to rotate in the direction indicated by the arrow at station 72 of FIG. 1. At the beginning of the cycle, wheelhead 20 is hydraulically advanced tangentially to station 72 to the position indicated in FIG. 1. Wheelhead 20 including motor 21 and base 23 is caused to translate at a controlled feed rate in a conventional manner by cylinder 25. The start and stop positions of the transverse motion of motor 21 and base 23 are controlled by limit switches. Limit switch 1LS controls the return position of motor 21 while limit switch 13LS controls the forward or grind position of motor 21. Grinding wheel 27 of wheelhead 20 generates surface 210 of workpiece 74 (FIG. 8A). There is no internal check of piecepart size by the machine. By transversing wheelhead 20 toward the workpiece a two inch distance at 7 seconds, it has been found that a ferromagntic workpiece of the size indicated above can be ground to size on 50,000 pieces with no dressing of the grinding wheel required. Approximately every 5,000 passes of workpieces require adjustment of approximately 0.001 inches for wear of grinding wheels.

As indicated previously, all the grinding wheels are identical and thus dressing requirements as related to wheelhead 20 apply equally well to wheelheads 30, 40 and 50. At the end of the grinding of workpiece 174 at station 72, wheelhead 20 is caused to traverse to its return position. When it reaches its return position limit switch 1LS activates cylinder 25 to stop the travel of the wheelhead.

In a similar manner, workhead 30 is caused to grind surface 208 (FIG. 8A) of workpiece 174. Limit switch 2LS indicates the return position of wheelhead 30 while limit switch 14LS positions the wheelhead at the position illustrated in FIG. 1. Likewise, limit switch 3LS indicates the original return position of motor 41 and limit switch 15LS controls the most forward position of wheelhead 40 toward workstation 74. Grinding wheel 47 grinds the bottom planar surface 206 of the workpiece. It should be noted that the return travel of each of the workheads is solely by means of air cylinders while the feed travel is a combination of air and hydraulic as indicated, hence the motors are returned relatively quickly to the return position. At the end of each grind operation, indexing table 90 is rotated one position so that nest 100 and its accompanying workpiece is positioned to the next workstation. Thus the workpiece originally positioned at workstation 70 is indexed to station 71 where it is clamped, aligned and then indexed in a second cycle to station 72. Upon completion of the grinding surface 210 at station 72 the next cycle commences in which the workpiece is indexed to station 73 where surface 208 is generated. The next succeeding cycle indexes the workpiece to workstation 74 wherein surface 206 is generated. Surface 206 is generated substantially normal to the mean axis while surfaces 208 and 210 are substantially concentric with mean axis 202 within 0.005 inches on an actual piecepart ground by a machine built in accordance with the present invention. Surface 206 is generated flat and parallel within 0.005 inches of surface 204.

To grind surface 204, a problem arises with workhead 176 clamped firmly and securely against surface 204. In this position, that is with the workpiece clamped and aligned with workhead 16, it is not possible for any grinding wheel to perform work on surface 204. Thus in the next cycle, the workpiece is transfered to workstation 75 where in the following cycle, the workpiece is transferred to workhead 18. To transfer the workhead, workpiece transfer mechanism 60 of FIGS. 10 and 11 is utilized.

At the beginning of the cycle transfer mechanism 60 is positioned as illustrated in FIG. 1. Assuming the workpiece now to be transferred is situated at station 74 at the end of the current cycle at which the surface 206 is being generated, the indexing table transfers workpiece at station 74 to station 75 and at the same time workpiece align support and drive assembly 160 causes shaft 172 to retract to its uppermost position as shown in FIG. 3. When at station 75, shaft 172 is in its raised position and corresponding motor 164 is off. During the dwell time when the workpiece is positioned at the station 75, upper arm assembly 350 is swung to the right over station 75. Upper arm assembly 350 is in its raised position at this time. When the arm assembly swings over station 75 air cylinder 354 is activated by solenoid 354' and lowers arm assembly 350. Jaws 387 and 384 are thus caused to be displaced downwardly around surface 208. In this position cylinder 374 whose shaft is fully extended at this time is activated by solenoid 374' which retracts the air cylinder shaft closing jaws 387,388 about surface 208. Air cylinder 354 is now caused to raise upper arm assembly 350 by means of solenoid 354''. Solenoid 394'' causes air cylinder 394 to extend rack 392 out of the drawing of FIG. 10 returning arm assembly 350 to the position shown in FIG. 1. When the upper arm assembly is disposed over jaws 138 air cylinder 374 is caused by solenoid 374'' to unclamp the workpiece. Air cylinders 150 and 151 on workhead 18 are then caused to retract, whereby springs 14 in clamp assembly 136 forces jaws 138 to clamp the workpiece to table 130. At this time solenoids 150'' and 151'' activate air cylinders 150 and 151 respectively retracting cylinder shafts causing levers 152 to release jaws 138.

The workpiece is now positioned on workhead 18 station 80 and remains there for the remainder of the current cycle. With the start of a new cycle, linkage 134 causes index head 132 to index the workpiece at station 80 to station 81.

At the beginning of the next cycle linkage 134 causes indexing head 132 to rotate the table 130 advancing the workpiece from station 80 to 81. As is evident from the description given, the workpieces at each station advance counterclockwise looking into the drawing of FIG. 1, one station at a time. Workpieces on both workstations 16 and 18 advance in synchronism. The workpiece being positioned at station 81 of workhead 18 is clamped against locating insert 142 (FIG. 2). During this cycle wheelhead 50 is advanced toward the workpiece so that grinding wheel 57 generates surface 204 of the workpiece. The workpiece is not rotating on the workhead 18 and the grinding wheel makes a complete pass over the entire surface 204. Wheelhead 50 is then caused to return to its return position from the grind position and the next cycle commences advancing the workpiece to station 82. During this cycle no work is performed on the workpiece. In the next cycle the workpiece is advanced from station 82 to station 83 wherein air cylinder 150 is caused to force lever 152 against jaws 138 releasing the clamped workpiece. During the dwell time of this cycle (workpieces are in their proper stations), the operator removes the workpiece from station 83. At the same time the operator loads a new piece in station 70 while the machine is transferring a workpiece from station 75 to station 80.

Thus by the term cycle is meant the time between the advance of a workpiece from one station to the next station. During the time of this cycle the grinding wheels advance and perform the grinding during a seven second feed time. The wheelheads then commence to perform their abrading operation during an 18 second grind time. At the end of the 18 second grind period the respective air cylinders 25, 35, 46 and 56 cause the wheelheads to return to their return position to start a new cycle. During a cycle, upper arm assembly 350 of the transfer device swings over station 75, drops down, clamps the outer neck of the workpiece, lifts the workpiece off the nest 100, transfers the workpiece over to workhead 18, station 80 and releases the workpiece. The workpiece is clamped by clamping mechanism 136 at station 80. The clamping mechanism 136 at stations 80 and 83 work in unison both clamping and releasing at the same time. In the same cycle, motors 164 which relate to stations 72, 73 and 74 are in the on state while the motors 164 relating to stations 70, 71 and 75 are always in the off state. In addition, workpiece align, support and drive assembly 160 is positioned so that align and drivehead assembly 176 is up over station 75, 70 and down over the remaining stations. The off-on state of motors 164 and the up and down position of align and drivehead assembly 176 is always the same with respect to these stations.

When indexing table 90 advances as best seen in FIG. 3, the entire superstructure 120 including the table 90 and nest 100 advances with each advance of table 90. As is now clear, power interconnecting assembly 300, workpiece align, support and drive assembly 160 and nest 100 all rotate about the support member 312 by way of bearings 308 and indexing head 92.

Thus as provided by the grinding machine of the present invention an apparatus is described which provides means for intersecting the mean axis of a hollow workpiece with a machine axis. In addition, means are provided for clamping the workpiece and simultaneously tilting and axially displacing the workpiece so as to align the mean axis of the workpiece substantially in coincidene with the machine axis. In addition in accordance with the present invention features are provided which advance this apparatus to a plurality of workstations, a different surface of revolution or planar surface being generated on the workpiece with respect to that mean axis. In addition, means are provided for transferring the workpiece from a first workhead to a second workhead for further generating a planar surface with respect to the mean axis of the workpiece.

It is to be understood that feeds and speeds and the particular composition of grinding wheels are within the state of the art of ferromagnetic grinding and no further description will be provided with respect to these details.

What is claimed is:

1. A work mounting device including an apparatus for orienting the mean axis of an irregular inner surface of revolution of a hollow workpiece to an apparatus axis comprising:
    a plurality of support members rigidly secured to said apparatus to define a workpiece support plane normal to said apparatus axis, said workpiece inner surface abutting at least one of said members when said workpiece is at said plane,
    means for initially orienting the workpiece so that said mean axis intersects said apparatus axis and said workpiece is spaced from said plane, and
    displacement means for tilting said workpiece so that said mean axis is substantially coincident with said apparatus axis and simultaneously axially displacing said workpiece to said plane.

2. The device of claim 1 wherein said workpiece has an annular surface whose axis substantially coincides with said mean axis, said orienting means including annular gripping means whose axis coincides with said apparatus axis, said gripping means gripping said annular surface to orient said workpiece.

3. The device of claim 2 wherein said gripping means is a mandrel whose gripping surfaces are spaced from said rigid support members.

4. The device of claim 1 wherein said workpiece has a planar surface disposed at an angle to said mean axis, said tilting and displacing means including a planar reference pressure plate disposed normal to said apparatus axis and arranged to translate along said apparatus axis against said planar surface.

5. The device of claim 4 wherein said orienting means includes a mandrel and said tilting and displacing means includes a resiliently mounted mandrel operating cam and means for resiliently mounting said pressure plate.

6. The device of claim 4 further including means for mounting said apparatus to rotate about said apparatus axis, said tilting and displacing means including means for rotating said apparatus.

7. The device of claim 1 wherein said displacement means includes three support members resiliently secured to said apparatus for resiliently supporting said workpiece when said mean axis is oriented to intersect said apparatus axis.

8. The device of claim 7 wherein said resilient members define a plane parallel to and spaced from said rigid support member plane.

9. The device of claim 1 further including means for rotating said apparatus about said apparatus axis.

10. The combination comprising:
    a rotatably mounted workpiece support body for supporting a hollow workpiece whose inner surface is an irregular surface of revolution,
    gripping means secured to said body for gripping the workpiece so as to orient the mean axis of said inner surface to intersect the axis of rotation of said body,
    a plurality of spaced support members rigidly secured to said body and arranged to define a workpiece support plane, said workpiece initially being spaced from said plane, and
    displacement means coupled to said body for tilting said workpiece so that said mean axis substantially coincides with said axis of rotation and simultaneously axially displacing said workpiece to said plane until at least one of said rigid members abuts said inner surface at said support plane.

11. The combination of claim 10 wherein said displacement means includes a plurality of support members resiliently mounted and arranged to resiliently support said workpiece when said mean axis is oriented to intersect said axis of rotation.

12. The combination of claim 11 wherein said resilient and rigidly mounted support members are mounted in the same imaginary surface of revolution.

13. The combination of claim 12 where the imaginary surface of revolution is conical and said resiliently mounted members reciprocate only in a direction toward the apex of said conical surface of revolution.

14. The combination of claim 13 wherein said irregular inner surface is substantially normal to said imaginary surface of revolution.

15. The combination of claim 10 wherein said gripping means is an expanding mandrel arranged to grip an annular inner surface of said workpiece and whose center substantially coincides with said mean axis.

16. The combination of claim 15 wherein said mandrel includes a plurality of pivotally mounted gripping fingers arranged in diametrically opposing pairs, each finger being capable of pivoting independently of the remaining fingers.

17. The combination of claim 16 wherein said tilting and displacing means includes a mandrel expanding cam and a workpiece tilting and displacing ram.

18. The combination of claim 17 wherein said cam and ram are independently and resiliently mounted.

19. A method of orienting the mean axis of an irregular inner surface of a hollow workpiece to a given axis, comprising the steps of:
    orienting the workpiece so that said mean axis intersects said given axis, and
    simultaneously tilting said workpiece so that said mean axis is substantially coincident with said given axis and axially displacing said workpiece to a plane normal to said given axis and defined by rigid support members positioned to abut said inner surface.

20. The method of claim 19 wherein said tilting step includes the step of pushing against a surface of the workpiece that is disposed at an angle to said mean axis in a direction along said given axis.

21. The method of claim 19 wherein said orienting step includes the steps of resiliently supporting said workpiece and centering a portion of the inner surface about said given axis.

22. The combination comprising:
a rotatably mounted workpiece support body for supporting a hollow workpiece whose inner surface is an irregular surface of revolution,
gripping means secured to said body for gripping the workpiece so as to orient the mean axis of said inner surface to intersect the axis of rotation of said body,
a plurality of spaced support members rigidly secured to said body and arrangd to define a workpiece support plane,
a plurality of support members resiliently mounted and arranged to resiliently support said workpiece when said mean axis is oriented to intersect said axis of rotation,
said resilient and rigidly mounted support members being mounted in the same imaginary conical surface of revolution, said resiliently mounted members reciprocating in a direction only toward the apex of said conical surface of revolution, and
means coupled to said body for tilting said workpiece so that said mean axis substantially coincides with said axis of rotation and simultaneously axially displacing said workpiece to said plane until at least one of said rigid members abuts said inner surface at said support plane.

23. The combination of claim 22 wherein said irregular inner surface is substantially normal to said imaginary surface of revolution.

24. The combination comprising:
a rotatably mounted workpiece support body for supporting a hollow workpiece whose inner surface is an irregular surface of revolution,
an expanding mandrel arranged to grip an annular inner surface of said workpiece and whose center substantially coincides with the workpiece inner surface mean axis to thereby orient said mean axis to intersect the axis of rotation of said body,
a plurality of spaced support members rigidly secured to said body and arranged to define a workpiece support plane, and
means coupled to said body for tilting said workpiece so that said mean axis substantially coincides with said axis of rotation and simultaneously axially displacing said workpiece to said plane until at least one of said rigid members abuts said inner surface at said support plane.

25. The combination of claim 24 wherein said mandrel includes a plurality of pivotally mounted gripping fingers arranged in diametrically opposing pairs, each finger being capable of pivoting independently of the remaining fingers.

26. The combination of claim 24 wherein said tilting and displacing means includes a mandrel expanding cam and a workpiece tilting and displacing ram.

27. The combination of claim 26 wherein said cam and ram are independently and resiliently mounted.

28. The combination comprising:
a workpiece support body for supporting a hollow workpiece whose inner surface is an irregular surface of revolution,
gripping means secured to said body for gripping the workpiece so as to orient the mean axis of said inner surface to intersect the axis of rotation of said body,
a plurality of spaced support members rigidly secured to said body and arranged to define a workpiece support plane, said workpiece being initially spaced from said plane,
a plurality of support members resiliently mounted and arranged to resiliently support said workpiece when said mean axis is oriented to intersect said axis of rotation,
said resilient and rigidly mounted support members being mounted in the same imaginary surface of revolution, said resiliently mounted members resiliently reciprocating in a direction along said surface of revolution, and
means coupled to said body for tilting said workpiece so that said mean axis substantially coincides with said axis of rotation and simultaneously axially displacing said workpiece to said plane until at least one of said rigid members abuts said inner surface at said support plane.

29. In combination:
a workpiece support body for supporting a hollow workpiece,
a plurality of workpiece support members rigidly secured to said body for defining a rigid workpiece support plane,
gripping means secured to said body for aligning a portion of said workpiece to a given axis,
a plurality of workpiece support members resiliently secured to said body for defining a resilient workpiece support plane disposed intermediate said rigid workpiece support plane and said gripping means, said resiliently secured members initially supporting said workpiece in a position spaced from said rigid workpiece support plane, and
workpiece displacement means coupled to said body and arranged to displace said workpiece along said given axis to said rigid workpiece support plane.

30. The combination of claim 29 wherein said rigidly secured members are rounded at said rigid workpiece support plane.

31. The combination of claim 29 wherein said resiliently secured members are rounded at said resilient workpiece support plane.

32. The combination of claim 31 wherein said resiliently secured members are arranged to reciprocate in an imaginary surface of revolution.

33. The combination of claim 32 wherein said resiliently secured members reciprocate in a direction substantially normal to the surface of the workpiece contiguous therewith in said initial supporting position.

34. The combination of claim 29 wherein said gripping means includes a mandrel and said displacement means includes a resiliently mounted mandrel operating cam.

35. A work mounting device including an apparatus for orineting the means axis of an irregular inner surface of revolution of a hollow workpiece to an apparatus axis, said workpiece having a planar surface disposed at an angle to said mean axis, said apparatus comprising:
a plurality of rigid support members secured to said apparatus to define a workpiece support plane normal to said apparatus axis, said workpiece inner surface abutting at least one of said members when said workpiece is at said plane, means for initially orienting the workpiece so that said mean axis intersects said apparatus axis and said workpiece is spaced from said plane, said orienting means including a mandrel, and tilting and displacing means for tilting said workpiece so that said mean axis is substantially coincident with said apparatus axis and simultaneously axially displacing said workpiece to said plane, said tilting and displacing means including a planar reference pressure plate disposed normal to said apparatus axis and arranged to translate along said apparatus axis against said planar surface, and further including a resiliently mounted mandrel operating cam and means for resiliently mounting said pressure plate.

* * * * *